(12) United States Patent
Kurobe et al.

(10) Patent No.: US 6,975,641 B1
(45) Date of Patent: Dec. 13, 2005

(54) DATA TRANSMISSION METHOD AND SYSTEM, AND DEVICE USED THEREFOR

(75) Inventors: Akio Kurobe, Tondabayashi (JP); Koji Ikeda, Neyagawa (JP); Go Kuroda, Izumisano (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 756 days.

(21) Appl. No.: 09/707,891

(22) Filed: Nov. 8, 2000

(30) Foreign Application Priority Data

Nov. 9, 1999 (JP) .................................. 11-318319

(51) Int. Cl.⁷ .......................................... H04L 12/413
(52) U.S. Cl. ..................................... 370/445; 714/758
(58) Field of Search ............................... 370/235, 248, 370/278, 445, 447, 436, 463, 509, 510, 512, 370/277, 394, 506; 714/731, 736, 758, 762

(56) References Cited

U.S. PATENT DOCUMENTS

| 4,803,681 A | 2/1989 | Takahashi |
| 5,892,759 A | 4/1999 | Taketsugu |

FOREIGN PATENT DOCUMENTS

| DE | 197 31 261 | 1/1999 |
| WO | 98/31139 | 7/1998 |

OTHER PUBLICATIONS

Shingakugihou (IEICE Technical Report) RCS97-207, "Broadband Radio Access Integrated Network (BRAIN) in MM-Wave Band—Radio Access Protocol", Jan., 1998, pp. 113-121.

*Primary Examiner*—Man U. Phan
*Assistant Examiner*—Toan Nguyen
(74) *Attorney, Agent, or Firm*—Wenderoth, Lind & Ponack, L.L.P.

(57) ABSTRACT

A system including a central unit 10, a terminal 20, and a relay device 30 relay transmission of isochronous data effectively, in a time-sharing manner. The central unit 10 cyclically carries out the polling. In response to the polling, the terminal 20 transmits a plurality of frames. The relay device 30 detects that the plurality of frames transmitted from the terminal 20 via a transmission path 40 are completely received based on carrier-sensing by a carrier detecting portion 308 incorporated in the relay device 30. The relay device 30, at the time of detection, transmits frames received thereby without error to the central unit 10.

15 Claims, 12 Drawing Sheets

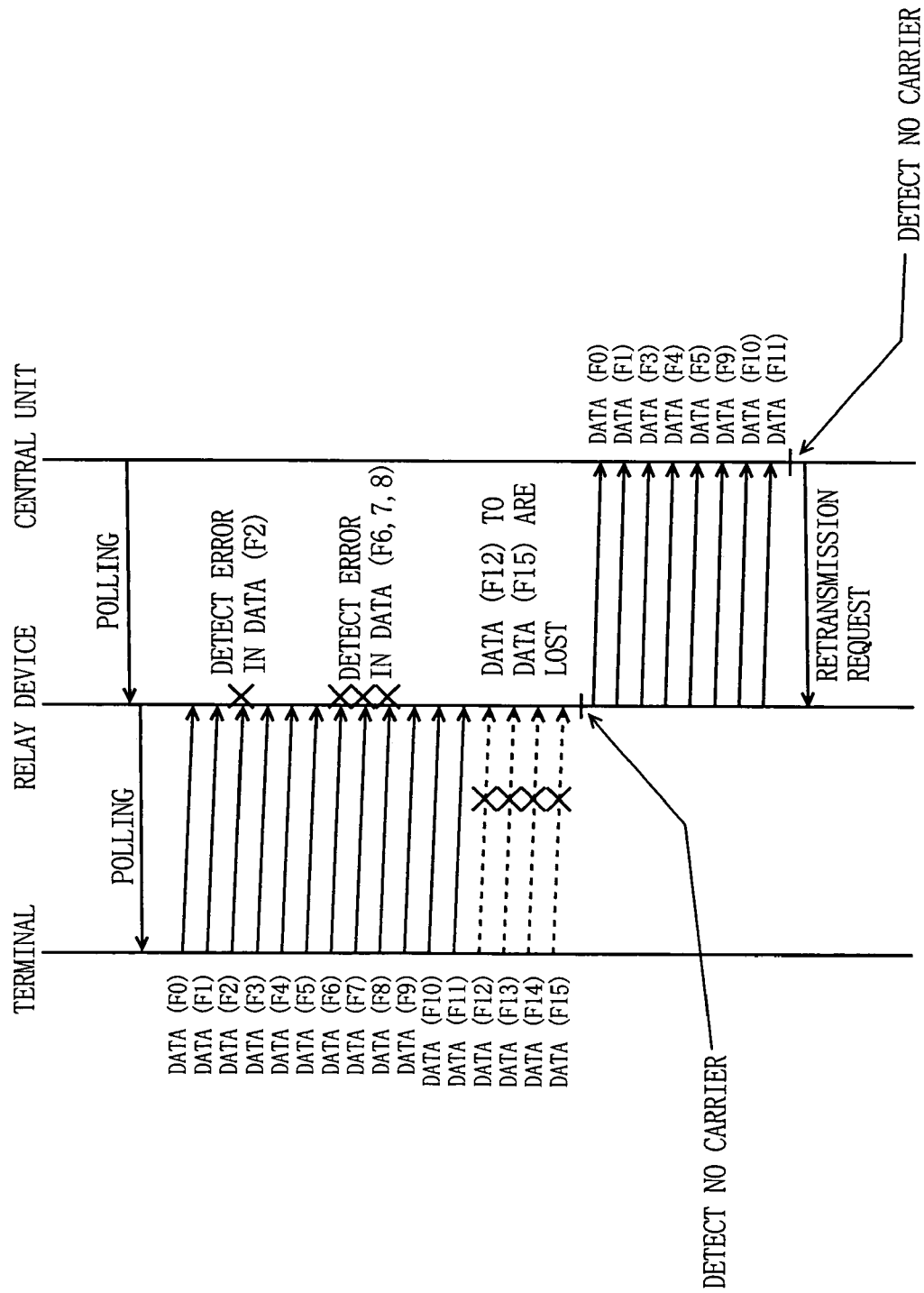

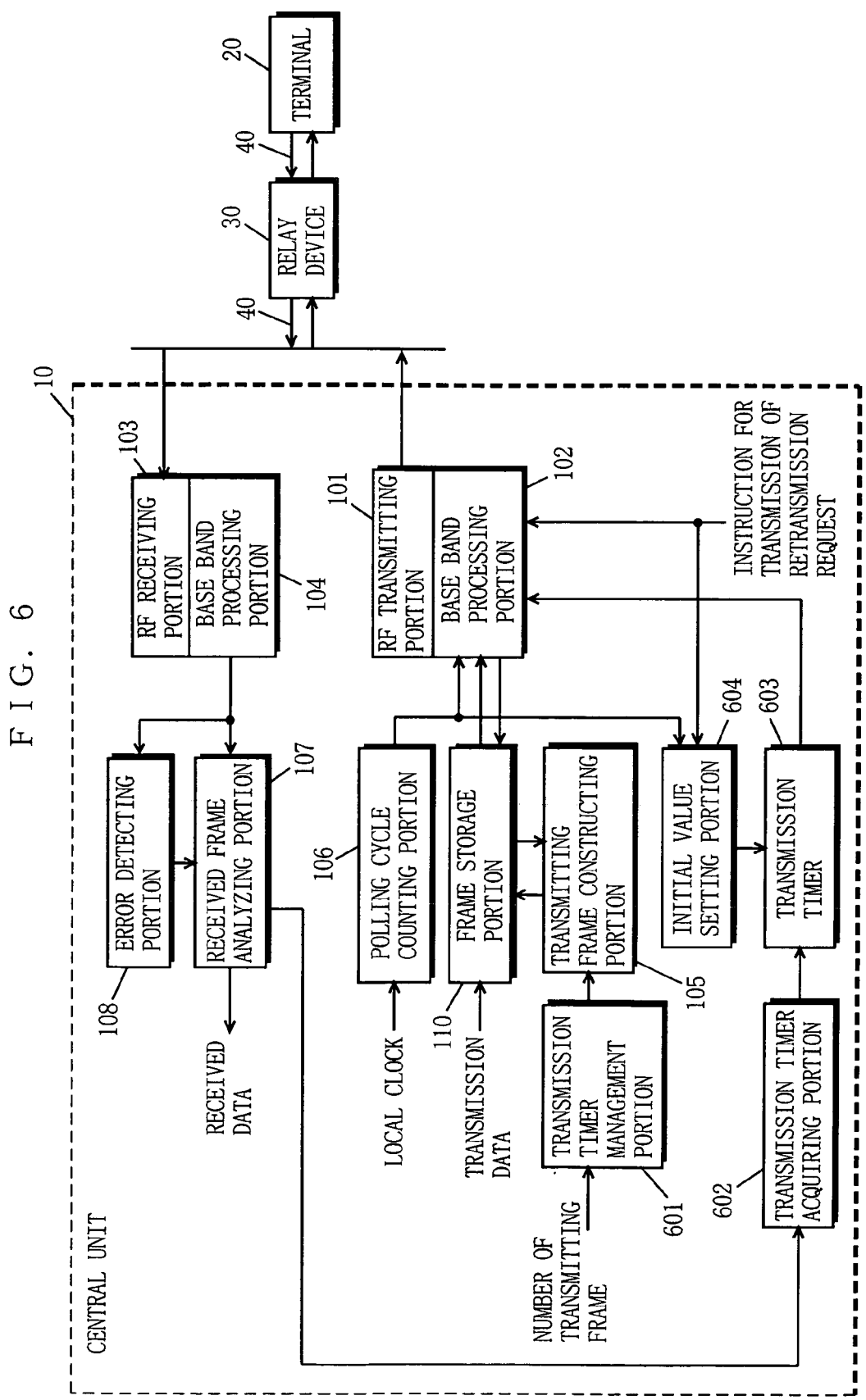

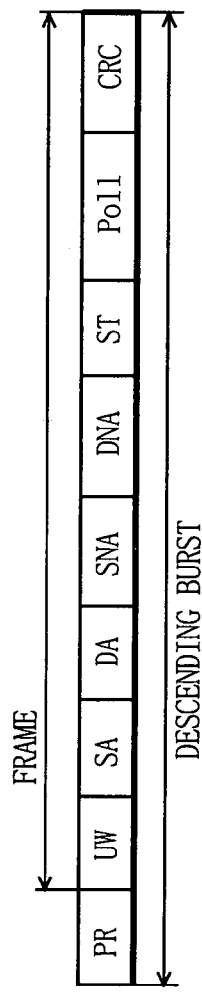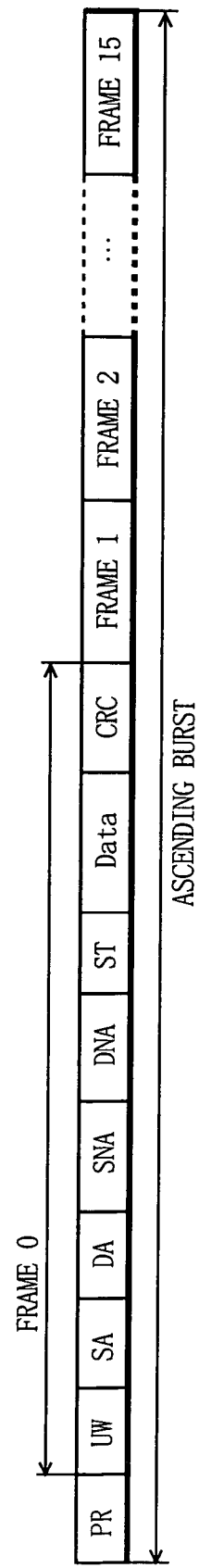
FIG. 9A
FIG. 9B

DATA TRANSMISSION METHOD AND SYSTEM, AND DEVICE USED THEREFOR

BACKGROUND OF THE INVENTION

1. Field of the Invention

The present invention relates to data transmission methods and systems, and devices used therefor and, more specifically, to a method, system, and device for transmitting isochronous data such as digitalized audio and video by using a radio signal as a transmission medium. Such transmission takes place in a media access control for LAN, or in a data link layer and network layer.

2. Description of the Background Art

Conventionally, in attempt of realizing a network enabling transmission of isochronous data such as digitalized audio and video by using a radio signal as a transmission medium, a technique of transmitting data over a millimetric radio wave ATM-LAN has been disclosed in Shingakugihou (IEICE Technical Report) RCS97-207, January, 1998. Described briefly in the following is the millimetric radio wave ATM-LAN.

FIG. 11 is a diagram structurally showing the conventional millimetric radio wave ATM-LAN. In FIG. 11, APs (AP1 to AP3) each denote an access point and serve as a master or central station. STAs each denote a terminal, and is controlled by any one AP. Communication between any STA and another STA is always carried out via the AP. The AP is connected to a wire-link network such as ATM. Therefore, the AP, in some cases, communicates with any STA controlled by other AP also connected to the wire-link device or network.

The AP controlls every STA in the area communicable by using millimetric waves (e.g., 60 GHz band) as the medium for radio transmission, and also manages radio transmission resources. Specifically, the AP inquires about an access request from any STA under control, and allocates, to the STA, the resource for radio transmission. For such allocation, the AP gives higher priority on isochronous data such as audio and video so that the transmission of such data completes within a predetermined time period with allowance. On the other hand, to the asynchronous data, allowed to be transmitted with some delay, the AP allocates the radio transmission resources so as to allocate the time that will remain after the isochronous data transmission is complete.

The AP then transmits a polling, in a predetermined cycle calculated by itself, to the STA allocated with the radio transmission resource for isochronous data, and permits data transmission therefrom. Upon permission, the STA that has received the polling from the AP transmits a data frame, and the AP receives the data frame. If a network address of the received data frame is addressed to other STA under control, the AP transmits the data frame thereto. If the network address is addressed to any STA in the wire-link network, the AP transmits the data frame thereto.

FIG. 12 is a diagram showing a sequence when an arbitrary STA in FIG. 11 transmits isochronous data to other STA via the AP. Hereinafter, the STA of the transmitting end and the STA of the receiving end are referred to as a transmitting STA and a receiving STA, respectively. In FIG. 12, the upper part shows a sequence for normal transmission and the lower part shows a sequence for transmission failed in its first transmission.

Referring to the upper part of FIG. 12, the AP first transmits a polling to the transmitting STA. In response thereto, the transmitting STA transmits data. The AP receives and transmits the data to the receiving STA.

Referring to the lower part of FIG. 12, the AP transmits a polling to the transmitting STA, waits for a predetermined time passes, and if not receiving data from the transmitting STA, transmits another polling to the transmitting STA and waits for data transmission therefrom.

Using the millimetric radio wave ATM-LAN described above, a full-duplex operation path must be formed in order to enable simultaneous use of an ascending transmission path directed from STA to AP and a descending transmission path directed from AP to STA. Herein, the full-duplex operation path is formed frequency-division-multiplexing using two radio channels.

Such bidirectional communication (full-duplex operation) through the frequency-division-multiplexing is easy to be implemented in a band having wide transmission range such as millimetric wave band. In the microwave band, however, usually only one channel can be used because a transmission speed in each channel reaches some megabits per second. Therefore, in the microwave band, one channel is generally multiplexed in a time-sharing manner so as to achieve bidirectional communication (half-duplex operation). In such case, a preamble bit, or the like, needs to be added at the head of an ascending burst and a descending burst for synchronization in radio transmitting/receiving devices. The preamble bit, in many cases, exceeds 100 bits. The overhead caused by the preamble bit is thus increased to an amount that can not be ignored with respect to data amount of control information such as polling. Consequently, the response time in the half-duplex operation disadvantageously reaches a level several times longer than that presumed in the full-duplex operation.

Further, in comparison of transmission quality with wire transmission, radio transmission shows increment in a bit error rate by more than two digits, which should be taken into account. Different from the bit error rate, a frame error rate, i.e., a rate of occurrence of error somewhere in a data frame, much depends on the number of bytes of the data frame. The more the number of bytes of the data frame is, the worse the frame error rate becomes.

The maximum frame lengths defined by the IEEE 802.3 standard and the IEEE 802.5 standard for the wire-link LAN are 1,500 bytes and 4,429 bytes, respectively. In comparison, the maximum frame length for the radio transmission is generally around 256 bytes. In this case, overhead caused by the data relevant to control information such as polling, in addition to that caused by the preamble bit, can not be ignored.

A relay device may be placed in between AP and STA in such case that the radio wave can not be directly transmitted due to any obstruction or too long distance therebetween. Even in this case, if frequency that can be used for radio transmission is limited, the communication between the AP and the relay device, and between the relay device and the STA are all done in the same radio transmission frequency. Accordingly, ascending and descending data in each section of transmission path should be multiplexed in a time-sharing manner to avoid data collision during transmission. Herein, by adopting the medium access control of a centralized-control-type using the polling, transmission control is easily done in a time-sharing manner. In such case, however, the transmission band is further reduced by half of the half-duplex operation. The overhead caused by the preamble bit and data relevant to the control information such as polling thus becomes more serious.

SUMMARY OF THE INVENTION

Therefore, an object of the present invention is to provide a data transmission method and system, and a device used therefor, capable of reducing overhead caused by the polling and also efficiently utilizing there source for radio transmission without signal collision in the ascending and descending paths in the half-duplex operation.

The present invention has the following features to achieve the object above.

A first aspect of the present invention is directed to a data transmission method for communication between first and second transmission devices transmitting/receiving a data frame by using a single transmission path, comprising the steps of:

detecting, at the first transmission device, that a carrier used for signal transmission of the data frame does not exist on the transmission path for confirming that the transmission path is available,
 transmitting one or more data frames in sequence from the first transmission device when the carrier does not exist,
 detecting, at the second transmission device, that the carrier does not exist on the transmission path for confirming that the transmission path is available when received one or more of the data frames transmitted from the first transmission device, and
 transmitting one or more data frames in sequence from the second transmission device when the carrier does not exist.

As described above, in the first aspect, with such structure that sequentially transmitting n-frames (where n is an arbitrary natural number) in response to a transmission right granted by a single polling, efficiency is improved by n-times. Further, the second terminal station can promptly move to the transmission procedure without collision with any frame transmitted by the first terminal station.

A second aspect of the present invention is directed to a data transmission method for communication between first and second transmission devices transmitting/receiving a data frame via a relay device by using a single transmission path, comprising the steps of:

detecting, at the relay device, when received one or more data frames transmitted from the first transmission device, an error in each of the received data frames;
 setting, at the relay device, only the data frame in which no error was detected as a data frame to be transmitted,
 detecting, at the relay device, that the carrier does not exist on the transmission path for confirming that the transmission path is available; and
 transmitting one or more data frames in sequence from the relay device to the second transmission device when the carrier does not exist.

As described above, in the second aspect, with such structure that sequentially transmitting n-frames in response to a transmission right granted by a single polling, efficiency is improved by n-times. Moreover, since the relay station is so structured as not to transmit error-detected frames, the efficiency is further improved. Still more, the relay station can promptly move to the transmission procedure without collision with receiving frames.

A third aspect of the present invention is directed to a data transmission method for communication between first and second transmission devices transmitting/receiving a data frame including a transmission timer value indicating a total frame time of data frames subsequent thereto by using a single transmission path, comprising the steps of:

sequentially transmitting n-data-frames (where n is an arbitrary natural number) each including the transmission timer value set to indicate (n-k) frame time (where k is an arbitrary natural number showing sequential order of transmission) from the first transmission device;
 detecting, at the second transmission device that has received one or more of the data frames each including the transmission timer value, the transmission timer value included in an error-free data frame among the received data frames;
 managing, at the second transmission device, an elapse of the total frame time of the subsequent data frames by using the detected transmission timer value and managing an elapse of a time period by using a predetermined initial value when no transmission timer value is detected, for confirming that the transmission path is available; and
 transmitting one or more data frames in sequence from the second transmission device when the transmission path is confirmed being available.

As described above, in the third aspect, with such structure that sequentially transmitting n-frames in response to a transmission right granted by a single polling, efficiency is improved by n-times. Further, without using carrier-sensing in the physical layer, the second terminal station can promptly move to the transmission procedure without collision with any frame transmitted by the first terminal station.

According to a fourth aspect, in the third aspect, the transmission path is implemented by radio transmission in an arbitrary frequency band.

As described above, in the fourth aspect, a transmission medium limited in the number of channels can be effectively utilized.

According to a fifth aspect, in the third aspect, the initial value is determined as the maximum time required for error-free transmission of all of the data frames.

As described above, in the fifth aspect, transmission is started after an elapse of the maximum suspension time assumed for error-free transmission of all of the data frames. In this manner, even if no data frame is received, transmission can be surely started.

According to a sixth aspect, in the third aspect, X in the step of detecting the transmission timer value, the transmission timer value is detected from every error-free data frame among the data frames received by the second transmission device; and
 in the step of confirming that the transmission path is available, an elapse of the total frame time of the subsequent data frames is started to be managed every time the transmission timer value is detected.

As described above, in the sixth aspect, the transmission timer value is sequentially detected from every error-free data frame among the received data frames, and by using the detected timer value, a total frame time of the subsequent data frames is updated. Accordingly, as the number of the subsequent data frames becomes smaller, the updated total frame time becomes more accurate. Further, the transmission timer value is correctly updated even if any data frame is lost or discarded due to error.

A seventh aspect of the present invention is directed to a data transmission method for communication between first and second transmission devices transmitting/receiving a data frame including a transmission timer value indicating a total frame time of data frames subsequent thereto via a relay device by using a single transmission path, comprising the steps of:

sequentially transmitting n-data-frames (where n is an arbitrary natural number) each including the transmission timer value set to indicate (n-k) frame time (where k is an arbitrary natural number showing sequential order of transmission) from the first transmission device;

detecting, at the relay device that has received one or more of the data frames each including the transmission timer value, an error in each of the received data frames;

detecting, at the relay device, the transmission timer value included in an error-free data frame among the received data frames;

setting, at the relay device, m-data frames (where m is a natural number not more than n) in which no error was detected as data frames to be transmitted;

setting, at the relay device, the transmission timer value for each of the data frames set as the data frames to be transmitted so as to indicate (m-k) frame time;

managing, at the relay device, an elapse of the total frame time of the subsequent data frames by using the detected transmission timer value for confirming that the transmission path is available; and transmitting one or more data frames in sequence from the relay device to the second transmission device when the transmission path is confirmed being available.

As described above, in the seventh aspect, with such structure that sequentially transmitting n-frames in response to a transmission right granted by a single polling, efficiency is improved by n-times. Moreover, since the relay station is so structured as not to transmit error-detected frames, the efficiency is further improved. Still more, the relay station can promptly move to the transmission procedure without collision with receiving frames even if a plurality of frames among the n-frames are failed to be received due to radio transmission error.

According to an eighth aspect, in the seventh aspect, the transmission path is implemented by radio transmission in an arbitrary frequency band.

As described above, in the eighth aspect, a transmission medium limited in the number of channels can be effectively utilized.

According to a ninth aspect, in the seventh aspect, in the step of detecting the transmission timer value, the transmission timer value is detected from every error-free data frame among the data frames received by the relay device; and in the step of confirming that the transmission path is available, an elapse of the total frame time of the subsequent data frames is started to be managed every time the transmission timer value is detected.

As described above, in the ninth aspect, the transmission timer value is sequentially detected from every error-free data frame among the received data frames, and by using the detected timer value, a total frame time of the subsequent data frames is updated. Accordingly, as the number of the subsequent data frames becomes smaller, the updated total frame time becomes more accurate. Further, the transmission timer value is correctly updated even if any data frame is lost or discarded due to error.

A tenth aspect of the present invention is directed to a data transmission system for communication between first and second transmission devices transmitting/receiving a data frame by using a single transmission path, wherein the first and second transmission devices each comprise:

a receiving portion for receiving the data frame;

a carrier detecting portion for detecting that a carrier used for signal transmission of the data frame does not exist on the transmission path; and a transmitting portion for transmitting the data frame, and the second transmission device that has received one or more of the data frames transmitted from the first transmission device detects, by the carrier detecting portion provided therein, that the carrier does not exist on the transmission path to confirm that the transmission path is available, and then transmits one or more data frames in sequence.

As described above, in the tenth aspect, with such structure that sequentially transmitting n-frames (where n is an arbitrary natural number) in response to a transmission right granted by a single polling, efficiency is improved by n-times. Further, the terminal station being the reception side can promptly move to the transmission procedure without collision with any frame transmitted by an arbitrary terminal station.

An eleventh aspect of the present invention is directed to a data transmission system for communication between first and second transmission devices transmitting/receiving a data frame via a relay device by using a single transmission path, wherein the first and second transmission devices each comprise:

a first receiving portion for receiving the data frame;

a first carrier detecting portion for detecting that a carrier used for signal transmission of the data frame does not exist on the transmission path; and a first transmitting portion for transmitting the data frame, the relay device comprises:

a second receiving portion for receiving the data frame;

a second carrier detecting portion for detecting that the carrier used for signal transmission of the data frame does not exist on the transmission path;

an error detecting portion for detecting an error in the data frame received by the second receiving portion;

a received frame analyzing portion for setting the data frame in which no error was detected by the error detecting portion as a data frame to be transmitted; and a second transmitting portion for transmitting the data frame, and the relay device, when received one or more of the data frames transmitted from the first transmission device, detects, by the second carrier detecting portion provided therein, that the carrier does not exist on the transmission path to confirm that the transmission path is available, and then transmits one or more of the data frames to be transmitted to the second transmission device in sequence.

As described above, in the eleventh aspect, with such structure that sequentially transmitting n-frames in response to a transmission right granted by a single polling, efficiency is improved by n-times. Moreover, since the relay station is so structured as not to transmit error-detected frames, the efficiency is further improved. Still more, the relay station can promptly move to the transmission procedure without collision with receiving frames.

A twelfth aspect of the present invention is directed to a data transmission system for communication between first and second transmission devices transmitting/receiving a data frame including a transmission timer value indicating a total frame time of data frames subsequent thereto by using a single transmission path, wherein the first and second transmission devices each comprise:
a receiving portion for receiving the data frame including the transmission timer value;
a transmission timer acquiring portion for acquiring the transmission timer value included in the data frame received by the receiving portion;
a transmission timer for suspending transmission for a frame time indicated by the transmission timer value acquired by the transmission timer acquiring portion, and when none of the timer values is acquired, suspending transmission for a time indicated by a predetermined initial value;
a transmitting frame constructing portion for constructing a data frame to be transmitted including the transmission timer value so set as to indicate the total frame time of the data frames subsequent thereto; and
a transmitting portion for transmitting the data frame to be transmitted constructed by the transmitting frame constructing portion, and
the second transmission device, when received one or more of the data frames transmitted from the first transmission device, confirms, by the transmission timer provided therein, that the transmission path is available through an elapse of the time of suspending transmission, and then transmits one or more of the data frames to be transmitted constructed by the transmitting frame constructing portion in sequence.

As described above, in the twelfth aspect, with such structure that sequentially transmitting n-frames in response to a transmission right granted by a single polling, efficiency is increased by n-times. Further, without using carrier-sensing in the physical layer, the terminal station being the reception side can promptly move to the transmission procedure without collision with any frame transmitted by an arbitrary terminal station.

According to a thirteenth aspect, in the twelfth aspect, the transmission path is implemented by radio transmission in an arbitrary frequency band.

As described, in the thirteenth aspect, a transmission medium limited in the number of channels can be effectively utilized.

According to a fourteenth aspect, in the twelfth aspect, the initial value is determined as the maximum time required for error-free transmission of all of the data frames.

As described above, in the fourteenth aspect, transmission is started after an elapse of the maximum suspension time assumed for error-free transmission of all of the data frames. In this manner, even if no data frame is received, transmission can be surely started.

A fifteenth aspect of the present invention is directed to a data transmission system for communication between first and second transmission devices transmitting/receiving a data frame including a transmission timer value indicating a total frame time of data frames subsequent thereto via a relay device by using a single transmission path, wherein the first and second transmission devices each comprise:
a first receiving portion for receiving the data frame including the transmission timer value;
a first transmission timer acquiring portion for acquiring the transmission timer value included in the data frame received by the first receiving portion;
a first transmission timer for suspending transmission for a frame time indicated by the transmission timer value acquired by the first transmission timer acquiring portion and when none of the timer values is acquired, suspending transmission for a time indicated by a predetermined initial value;
a first transmitting frame constructing portion for constructing a data frame to be transmitted including the transmission timer value so set as to indicate the total frame time of data frames subsequent thereto; and
a first transmitting portion for transmitting the data frame to be transmitted constructed by the first transmitting frame constructing portion, the relay device comprises:
a second receiving portion for receiving the data frame including the transmission timer value;
an error detecting portion for detecting an error in the data frame received by the second receiving portion;
a received frame analyzing portion for setting the data frame in which no error was detected by the error detecting portion as a data frame to be transmitted;
a second transmission timer acquiring portion for acquiring the transmission timer value included in an error-free data frame among the received data frames;
a second transmission timer for suspending transmission for a frame time indicated by the transmission timer value acquired by the second transmission timer acquiring portion,
a second transmitting frame constructing portion for constructing a data frame to be transmitted including the transmission timer value so set as to indicate the total frame time of the data frames subsequent thereto; and
a second transmitting portion for transmitting the data frame to be transmitted constructed by the second transmitting frame constructing portion, and
the relay device, when received one or more of the data frames transmitted from the first transmission device, confirms, by the second transmission timer provided therein, that the transmission path is available through an elapse of the time of suspending transmission, and then transmits one or more of the data frames to be transmitted constructed by the second transmitting frame constructing portion to the second transmission device in sequence.

As described above, in the fifteenth aspect, with such structure that sequentially transmitting n-frames in response to a transmission right granted by a single polling, efficiency is improved by n-times. Moreover, since the relay station is so structured as not to transmit error-detected frames, the efficiency is further improved. Still more, the relay station can promptly move to the transmission procedure without collision with receiving frames even if a plurality of frames among the n-frames are failed to be received due to radio transmission error.

According to a sixteenth aspect, in the fifteenth aspect, the transmission path is implemented by radio transmission in an arbitrary frequency band.

As described above, in the sixteenth aspect, a transmission medium limited in the number of channels can be effectively utilized.

A seventeenth aspect of the present invention is directed to a transmission device for transmitting/receiving a data frame by using a single transmission path, comprising:
a receiving portion for receiving the data frame;
a carrier detecting portion for detecting that a carrier used for signal transmission of the data frame does not exist on the transmission path; and a transmitting portion for transmitting the data frame, and
when received one or more data frames, detecting, by the carrier detecting portion provided therein, that the carrier does not exist on the transmission path to confirm that the transmission path is available, and then transmitting one or more data frames in sequence.

As described above, in the seventeenth aspect, with such structure that sequentially transmitting n-frames (where n is an arbitrary natural number) in response to a transmission right granted by a single polling, efficiency is improved by n-times. Further, the terminal station can promptly move to the transmission procedure without collision with any frame transmitted by other terminal stations.

An eighteenth aspect of the present invention is directed to a relay device for relaying data transmission from a first transmission device transmitting a data frame to a second transmission device by using a single transmission path, comprising:

a receiving portion for receiving the data frame;
a carrier detecting portion for detecting that a carrier used for signal transmission of the data frame does not exist on the transmission path;
an error detecting portion for detecting an error in the data frame received by the receiving portion;
a received frame analyzing portion for setting only the data frame in which no error was detected by the error detecting portion as a data frame to be transmitted; and
a transmitting portion for transmitting the data frame to be transmitted, and
when received one or more data frames transmitted from the first transmission device, detecting, by the carrier detecting portion, that the carrier does not exist on the transmission path to confirm that the transmission path is available, and then transmitting one or more of the data frames to be transmitted to the second transmission device in sequence.

As described above, in the eighteenth aspect, with such structure that sequentially transmitting n-frames in response to a transmission right granted by a single polling, efficiency is improved by n-times. Moreover, since the relay station is so structured as not to transmit error-detected frames, the efficiency is further improved. Still more, the relay station can promptly move to the transmission procedure without collision with receiving frames.

A nineteenth aspect of the present invention is directed to transmission device for transmitting/receiving a data frame including a transmission timer value indicating a total frame time of data frames subsequent thereto by using a single transmission path, comprising:

a receiving portion for receiving the data frame including the transmission timer value;
a transmission timer acquiring portion for acquiring the transmission timer value included in the data frame received by the receiving portion;
a transmission timer for suspending transmission for a frame time indicated by the transmission timer value acquired by the transmission timer acquiring portion, and when none of the timer values is acquired, suspending transmission for a time indicated by a predetermined initial value;
a transmitting frame constructing portion for constructing a data frame to be transmitted including the transmission timer value so set as to indicate the total frame time of the data frames subsequent thereto; and
a transmitting portion for transmitting the data frame to be transmitted constructed by the transmitting frame constructing portion, and
when received one or more data frames, confirming, by the transmission timer, that the transmission path is available through an elapse of the time of suspending transmission, and then transmitting one or more of the data frames to be transmitted constructed by the transmitting frame constructing portion in sequence.

As described above, in the nineteenth aspect, with such structure that sequentially transmitting n-frames (where n is an arbitrary natural number) in response to a transmission right granted by a single polling, efficiency is improved by n-times. Further, without using carrier-sensing in the physical layer, the terminal station being the reception side can promptly move to the transmission procedure without collision with any frame transmitted by an arbitrary terminal station.

According to a twentieth aspect, in the nineteenth aspect, the initial value is determined as the maximum time required for error-free transmission of all of the data frames.

As described above, in the twentieth aspect, transmission is started after an elapse of the maximum suspension time assumed for error-free transmission of all of the data frames. In this manner, even if no data frame is received, transmission can be surely started.

A twenty-first aspect of the present invention is directed to a relay device for relaying data transmission from a first transmission device transmitting a data frame including a transmission timer value indicating a total frame time of data frames subsequent thereto, to a second transmission device by using a single transmission path, comprising:

a receiving portion for receiving the data frame including the transmission timer value;
an error detecting portion for detecting an error in the data frame received by the receiving portion;
a received frame analyzing portion for setting only the data frame in which no error was detected by the error detecting portion as a data frame to be transmitted;
a transmission timer acquiring portion for acquiring the transmission timer value included in the data frame received by the receiving portion;
a transmission timer for suspending transmission for a frame time indicated by the transmission timer value acquired by the transmission timer acquiring portion;
a transmitting frame constructing portion for constructing a data frame to be transmitted including the transmission timer value so set as to indicate the total frame time of the data frames subsequent thereto; and
a transmitting portion for transmitting the data frame to be transmitted constructed by the transmitting frame constructing portion, and
when received one or more data frames transmitted from the first transmission device, confirming, by the transmission timer, that the transmission path is available through an elapse of the time of suspending transmission, and then transmitting one or more of the data frames to be transmitted constructed by the transmitting frame constructing portion to the second transmission device in sequence.

As described above, in the twenty-first aspect, with such structure that sequentially transmitting n-frames in response to a transmission right granted by a single polling, efficiency is increased by n-times. Moreover, since the relay station is so structured as not to transmit error-detected frames, the efficiency is further improved. Still more, the relay station can promptly move to the transmission procedure without collision with receiving frames even if a plurality of frames among the n-frames are failed to be received due to radio transmission error.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing a sequence in the data transmission method according to the first embodiment;

FIG. 6 is a block diagram showing the structure of a system in which a data transmission method according to a second embodiment of the present invention applied, focusing on the structure of the central unit 10;

FIGS. 9A and 9B are diagrams exemplarily showing the structure of bursts used in the data transmission method according to the second embodiment;

DESCRIPTION OF THE PREFERRED EMBODIMENTS

First Embodiment

Figure 1:
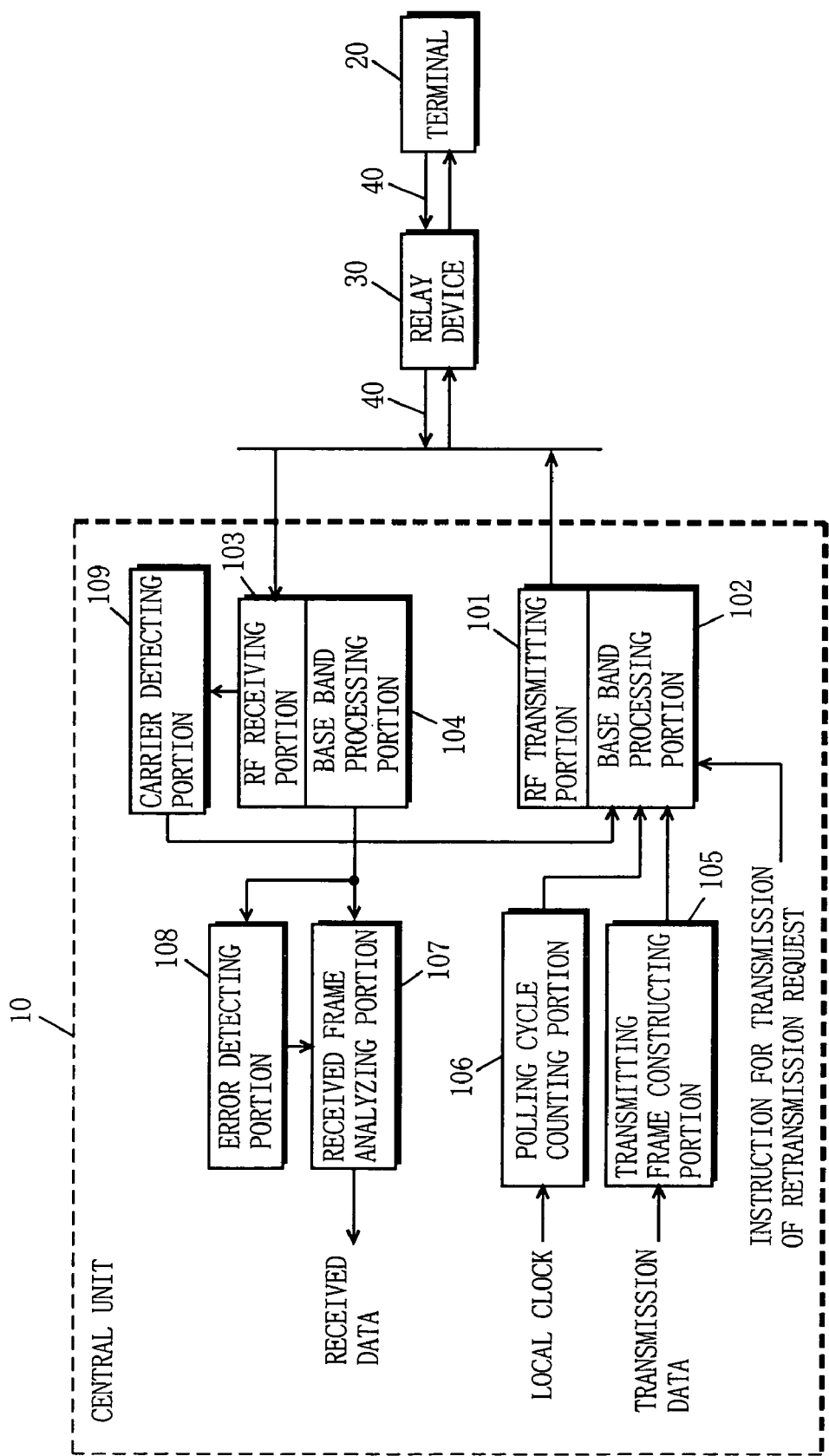
FIG. 1 is a block diagram showing the structure of a system in which a data transmission method according to a first embodiment of the present invention applied, focusing on the structure of a central unit 10.
Figure 2:
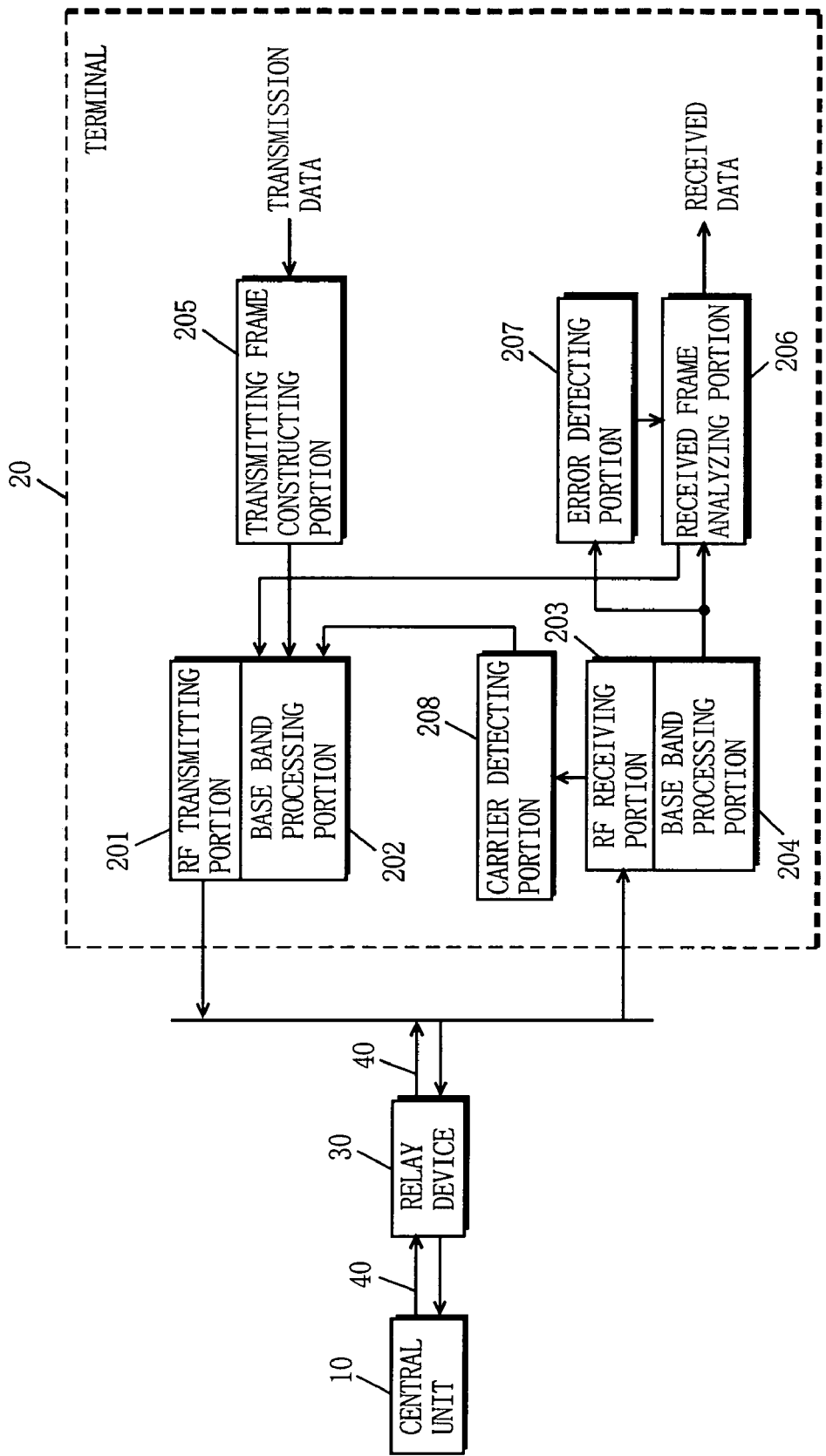
FIG. 2 is a block diagram showing the structure of the system in which the data transmission method according to the first embodiment applied, focusing on the structure of a terminal 20.
Figure 3:
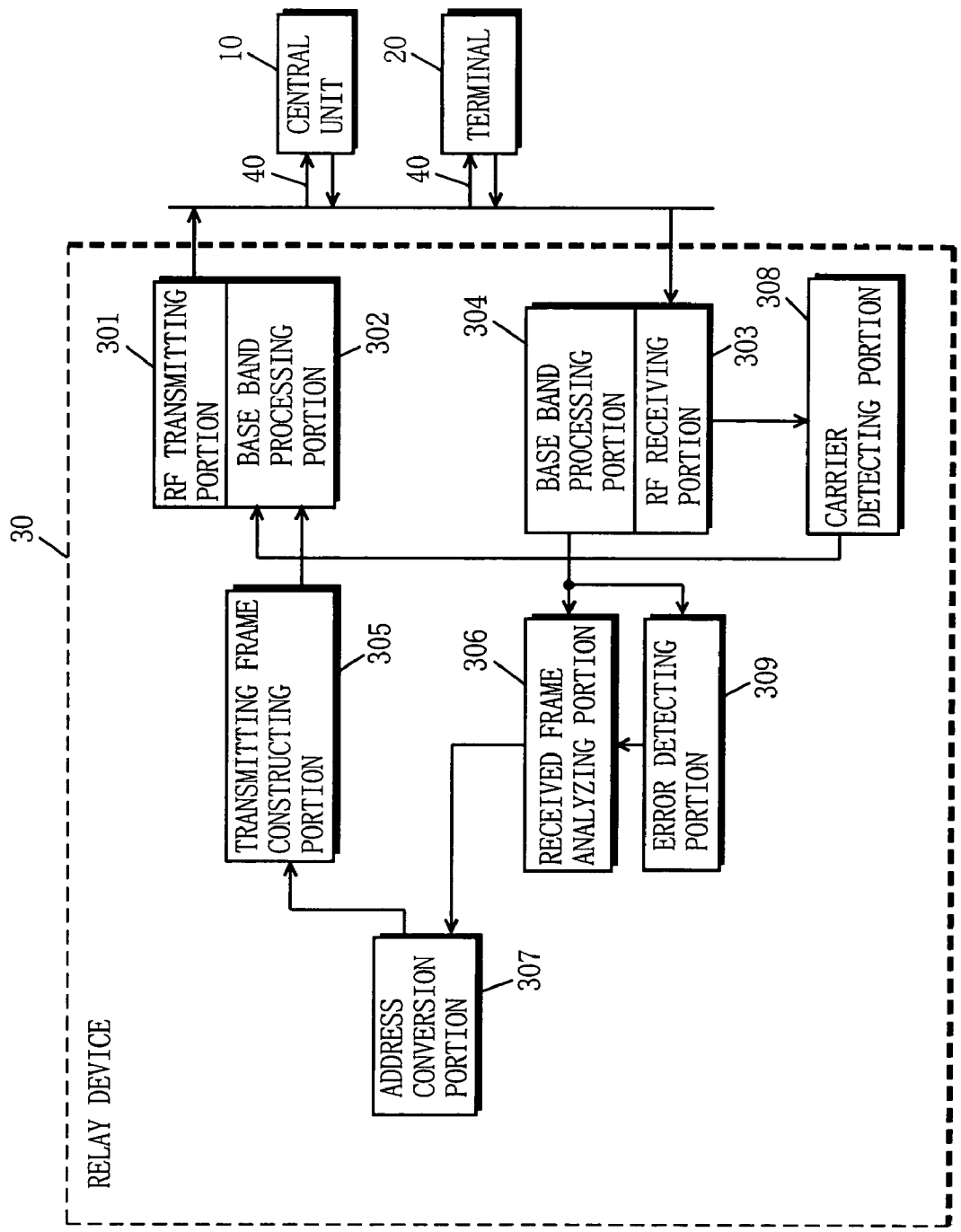
FIG. 3 is a block diagram showing the structure of the system in which the data transmission method according to the first embodiment applied, focusing on the structure of a relay device 30.

By referring to FIGS. 1 to 5, described are a method, system, and device for data transmission according to a first embodiment of the present invention. FIGS. 1 to 3 are block diagrams showing the structure of the system adopting the data transmission method according to the first embodiment. FIGS. 4A and 4B are diagrams exemplary showing the structure of bursts used in the data transmission method according to the first embodiment. FIG. 5 is a diagram showing a sequence in the data transmission method according to the first embodiment.

Referring to FIGS. 1 to 3, in the system adopting the data transmission method according to the first embodiment, a central unit 10 and a terminal 20 are connected with each other via a relay device 30 and a radio transmission path 40.

Referring to FIG. 1, the central unit 10 includes an RF transmitting portion 101 transmitting a signal to the radio transmission path 40, an RF receiving portion 103 receiving a signal from the radio transmission path 40, base band processing portions 102 and 104, a transmitting frame constructing portion 105 receiving transmitting data, a polling cycle counting portion 106 receiving a local clock, a received frame analyzing portion 107, an error detecting portion 108, and a carrier detecting portion 109 receiving a signal from the RF receiving portion 103.

Referring to FIG. 2, the terminal 20 includes an RF transmitting portion 201 transmitting a signal to the radio transmission path 40, an RF receiving portion 203 receiving a signal from the radio transmission path 40, base band processing portions 202 and 204, a transmitting frame constructing portion 205 receiving transmitting data, a received frame analyzing portion 206, an error detecting portion 207, a carrier detecting portion 208 receiving a signal from the RF receiving portion 203.

Referring to FIG. 3, the relay device 30 is connected each other with the central unit 10 and the terminal 20 via the radio transmission path 40. The relay device 30 includes an RF transmitting portion 301 transmitting a signal to the radio transmission path 40, an RF receiving portion 303 receiving a signal from the radio transmission path 40, base band processing portions 302 and 304, a transmitting frame constructing portion 305, a received frame analyzing portion 306, an address conversion portion 307, a carrier detecting portion 308, and an error detecting portion 309.

Figure 4A:
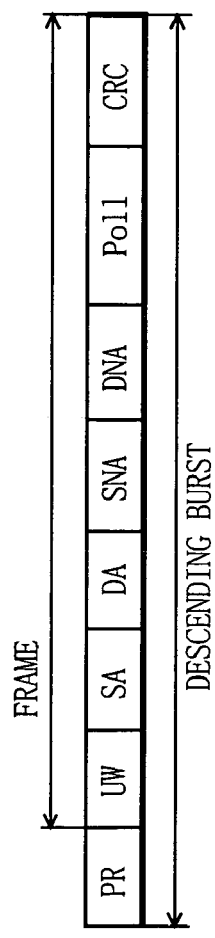
FIGS. 4A and 4B are diagrams exemplarily showing the structure of bursts used in the data transmission method according to the first embodiment.
Figure 4B:
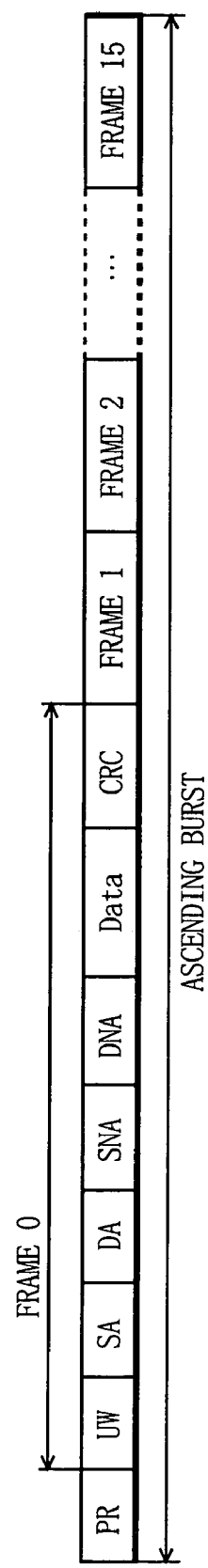

Next, by referring to FIGS. 4A and 4B, described is the structure of the bursts used in the data transmission method according to the first embodiment. FIG. 4A shows the structure of a descending burst which is transmitted from the central unit 10 to the terminal 20. FIG. 4B shows the structure of an ascending burst which is transmitted from the terminal 20 to the central unit 10.

At the head of each burst, a preamble bit PR is added to establish bit synchronization on the receiving end. The preamble bit PR is followed by a unique word UW, which is a region for frame synchronization. UW is followed by a data link address of a sender SA and then a data link address of a destination (receiving end) DA. DA is followed by SNA and DNA, which are regions for network addresses for routing.

For transmission from the central unit 10 to the terminal 20 via the relay device 30, the central unit 10 sets the data link address and the network address of its own to SA and SNA, respectively. The central unit 10 then sets the data link address of the relay device 30 to DA, and the network address of the terminal 20 to DNA. The relay device 30 receives the burst with such addresses being set, converts SA into the data link address of its own, converts DA into the network address of the terminal 20, and then reconstructs the frame for transmission.

In FIG. 4A, "Poll" is a control region indicating the polling. In FIG. 4B, "Data" is video data, audio data, or computer data. "CRC" is a code for detecting information error in the range from SA to Poll in the descending burst, and from SA to Data in the ascending burst. Since the data link address is converted in the relay device 30, CRC is recalculated therein. Herein, the ascending burst in FIG. 4B is presumably structured by 16 frames numbered from 0 to 15.

Referring back to FIG. 1, the procedure of polling transmission, i.e., descending transmission, is described. In the central unit 10, the transmitting frame constructing portion 105 receives transmission data and constructs a frame. In the constructed frame, SA and SNA are set as the data link address and the network address of the central unit 10, DA is set as the data link address of the relay device 30, and DNA is set as the network address of the terminal 20. Thus constructed frame is outputted to the base band processing portion 102.

The polling cycle counting portion 106 receives an internal local clock, and with the received clock, counts a predetermined polling cycle. The polling cycle counting portion 106 controls the base band processing portion 102 based on the result of the counting. By such control, the central unit 10 controls timing for polling transmission.

The carrier detecting portion 109 detects that the RF receiving portion 103 is receiving a carrier and informs the base band processing portion 102 of the detection. Under the control by polling cycle counting portion 106 and the carrier detecting portion 109, the base band processing portion 102 adds PR to the frame outputted by the transmitting frame constructing portion 105, and constructs the descending burst. The constructed descending burst is transmitted from the RF transmitting portion 101 to the terminal 20 via the radio transmission path 40.

The transmission of the descending burst constructed as above is enabled after a control instruction from the polling cycle counting portion 106 or a transmission instruction of a retransmission request from a communication control portion (not shown in the drawing) is issued, and at the time the carrier detecting portion 109 stops informing of the carrier detection. In this manner, the central unit 10 can transmit the polling to the terminal 20 at the predetermined polling cycle, without collision with the ascending burst.

Further, the central unit 10, when detecting that any frame has been discarded in the received ascending burst, can promptly transmit a retransmission request for the discarded frame(s) without collision with any ascending burst.

Referring back to FIG. 3, described is the processing carried out by the relay device 30 when receiving the polling transmitted from the central unit 10 (in descending direction). In the relay device 30, the RF receiving portion 303 receives the descending burst transmitted from the central unit 10 via the radio transmission path 40. The received burst is supplied to the base band processing portion 304.

The base band processing portion 304 establishes bit synchronization with the supplied descending burst by using PR, and establishes frame synchronization therewith by using UW. Thereafter, the base band processing portion 304 transfers the data following UW (SA to CRC) to the received frame analyzing portion 306 and the error detecting portion 309.

The error detecting portion 309 detects CRC error of the transferred data and informs the received frame analyzing portion 306 of any error detected. The received frame analyzing portion 306 confirms that DA in the transferred data indicates the address of the relay device 30, and if not informed of the error detection from the error detecting portion 309, transfers the entire frame including DNA to the address conversion portion 307.

The address conversion portion 307 stores correspondences between DNA and DA. The address conversion portion 307 searches for DA corresponding to DNA included in the frame transferred from the received frame analyzing portion 306, writes the search result into DA of the frame, and then transfers the frame to the transmitting frame constructing portion 305. Herein, the search by the address conversion portion 307 is preferably performed within the same time period for every address. Therefore, the search is typically performed on a principle that memory contents are outputted within the same time period upon selection of a memory address. As an alternative method of address conversion, the central unit 10 may determine the route from SNA to DNA and add information about the determined route as a group of DAs to every frame. In such manner, the address conversion portion 307 does not need to store the correspondences between DNA and DA as described above. Note, in this case, it is required to add such group of DAs indicating route information to each frame in FIGS. 4A and 4B. The present invention, however, is not restricted to any of the address conversion methods in exerting its effects.

Next, the transmitting frame constructing portion 305 rewrites SA in the frame transferred from the address conversion portion 307 to that of the relay device 30. Thereafter, transmitting frame constructing portion 305 calculates CRC in the range from SA to the control region (Poll), and outputs the frame to the base band processing portion 302.

The base band processing portion 302, if not informed of the carrier detection from the carrier detecting portion 308, adds PR to the frame outputted by the transmitting frame constructing portion 305 and reconstructs the descending burst. The reconstructed descending burst is transmitted from the RF transmitting portion 301 to the terminal 20 via the radio transmission path 40.

Referring back to FIG. 2, in the terminal 20, the descending burst transmitted via the radio transmission path 40 is reecived by the RF receiving portion 203. The received burst is supplied to the base band processing portion 204.

The base band processing portion 204 establishes bit synchronization with the supplied descending burst by using PR, and establishes frame synchronization therewith by using UW. Thereafter, the base band processing portion 204 transfers the data following UW (SA to CRC) to the received frame analyzing portion 206 and the error detecting portion 207.

The error detecting portion 207 detects CRC error of the transferred data and informs the received frame analyzing portion 206 of any error detected. The received frame analyzing portion 206 confirms that DA indicates the address of the terminal 20, and if not informed of the error detection from the error detecting portion 207, analyzes the control region (Poll). The received frame analyzing portion 206 outputs a polling detection signal, which is a signal informing that the polling is detected as a result of the analysis, to the base band processing portion 202 and a communication control portion (not shown) provided in the terminal 20.

Next, the procedure of data transmission, i.e., ascending transmission, is described. In the terminal 20, as described above, the received frame analyzing portion 206 outputs the polling detection signal to the base band processing portion 202 so as to instruct frame transmission. The transmitting frame constructing portion 205 is supplied with transmission data (Data) by the communication control portion (not shown) which was also supplied with the polling detection signal.

The transmitting frame constructing portion 205 sets the address of the terminal 20 to SA and SNA, the address of the relay device 30 to DA, and the network address of the central unit 10 to DNA. Thereafter, the transmitting frame constructing portion 205 calculates CRC with respect to SA, DA, SNA, DNA, and Data. In this way, the transmitting frame constructing portion 205 constructs n-frames (n is a natural number) for transmission.

The carrier detecting portion 208 detects that the RF receiving portion 203 is receiving a carrier and informs the base band processing portion 202 of the detection. Under the control by the received frame analyzing portion 206 and the carrier detecting portion 208, the base band processing portion 202 adds PR to the head frame outputted by the transmitting frame constructing portion 205, and constructs an ascending burst. The ascending burst is transmitted from the RF transmitting portion 201 to the central unit 10 via the radio transmission paths 40. In such manner, the terminal 20 transmits, in response to a single polling, the ascending burst composed of the n-frames.

Next, by referring to FIG. 3, described is the processing carried out by the relay device 30 when receiving the data transmitted from the terminal 20 (in ascending direction). In the relay device 30, the ascending burst transmitted from the terminal 20 via the radio transmission path 40 is received by the RF receiving portion 303. The received burst is supplied to the base band processing portion 304.

The base band processing portion 304 establishes bit synchronization with the supplied ascending burst by using PR and establishes frame synchronization therewith by using UW. Thereafter, the base band processing portion 304 transfers the following data (SA to CRC) to the received frame analyzing portion 306 and the error detecting portion 309.

The error detecting portion 309 detects CRC error of the transferred data and informs the received frame analyzing portion 306 of any error detected. The received frame analyzing portion 306 confirms that DA indicates the address of the relay device 30, and if not informed of the error detection from the error detecting portion 309, transfers the entire frame including DNA to the address conversion portion 307.

The address conversion portion 307 stores correspondences between DNA and DA. The address conversion portion 307 searches for DA corresponding to DNA included in the frame transferred from the received frame analyzing portion 306, writes the search result into DA of the frame, and then transfers the frame to the transmitting frame constructing portion 305. As an alternative method of address conversion, the central unit 10 may determine the route from SNA to DNA and add information about the determined route as a group of DAs to every frame. In such manner, the address conversion portion 307 does not need to store the correspondences between DNA and DA for address conversion. Note, in this case, it is required to add such group of DAs indicating route information to each frame in FIGS. 4A and 4B. The present invention, however, is not restricted to any of the address conversion methods and in exerting its effects. Next, the transmitting frame constructing portion 305 rewrites SA in the frame transferred from the address conversion portion 307 to that of the relay device 30. Thereafter, transmitting frame constructing portion 305 calculates CRC in the range from SA to the data region, and outputs the frame to the base band processing portion 302.

The base band processing portion 302, if not informed of the carrier detection from the carrier detecting portion 308, adds PR to the head frame outputted by the transmitting frame constructing portion 305 and reconstructs the ascending burst. The reconstructed ascending burst is transmitted from the RF transmitting portion 301 to the central unit 10 via the radio transmission path 40.

Next, by referring to FIG. 5, described is the data transmission method according to the first embodiment applied in the above described data transmission system. In FIG. 5, data F0 to F15 each indicate a frame. Each X denotes transmission error of a data frame. In the drawing, if no error occurs in UW and thus the base band processing portion succeeded in receiving a data frame, such X is marked at the end of a solid line arrow. If any error occurs in UW and thus the base band receiving portion failed to receive a data frame, such X is marked on the middle of a dotted line arrow.

For polling procedure, the central unit 10 firstly transmits a polling to the relay device 30. Thereafter, the relay device 30 transmits the polling to the terminal 20. In response thereto, the terminal 20 promptly returns the data frames (F0 to F15) in sequence.

The relay device 30 sequentially receives such data frames. Herein, the data frames F2, F6, F7, and F8 are detected to have error by the error detecting portion 309, and thus are discarded. The data frames F12 to F15 have error in UW, and thus are not received by the base band processing portion 304. As a result, the frames exclusive of the above are subjected to address conversion in the address conversion portion 307, and then transferred to the transmitting frame constructing portion 305. While the RF receiving portion 303 receives the data frames F0 to F15, the carrier detecting portion 308 informs the base band processing portion 302 of the carrier detection. These frames are thus not enabled for transmission yet. When the RF receiving portion 303 finishes receiving the data frame F15, no more carrier is detected. Accordingly, the carrier detecting portion 308 stops informing the base band processing portion 302 of the carrier detection. At the same instant, frame transmission to the central unit 10 is started sequentially from the data frame F0.

In this transmission, none of the error-detected frame is transmitted, enabling effective use of the transmission band. Further, the central unit 10, being the receiving end, similarly performs carrier-sensing. As a result, the central unit 10 transmits, without delay, a retransmission request for such error-detected frames immediately after the receipt of eight frames, also enabling effective use of the transmission band.

As described in the foregoing, according to the data transmission method of the first embodiment, with such structure that sequentially transmitting n-frames in response to a transmission right granted by a single polling, efficiency is improved by n-times. Moreover, since the relay station is so structured as not to transmit error-detected frames, the efficiency is further increased. Still more, the relay station can smoothly move to the transmission procedure without collision with receiving frames. Further, the central station can request for retransmission of the error-detected frames which have not been received, without delay.

The data transmission system according to the first embodiment includes the relay device 30, but may include a plurality of relay devices. Or, in the data transmission system of this embodiment, the relay device 30 may not be included, and the central unit 10 and the terminal 20 may be connected via the radio transmission path 40. Even in such case, the central unit 10 can transmit a polling to the terminal 20 at a predetermined polling cycle without collision with the ascending burst.

Further, in the data transmission method according to the first embodiment, network addresses are used for routing. The network addresses are not necessarily used if the route is already fixed, or if a connection ID, or the like, is used.

Still further, according to the data transmission system of the first embodiment, the transmitting frame constructing portion 105 supplies the transmitting frame to the base band processing portion 102. Alternatively, a buffer or a frame storage portion may be provided between those constituents. In that case, the base band processing portion 102 controls the buffer or the frame storage portion so as to receive the transmitting frame therefrom.

Second Embodiment

Figure 7:
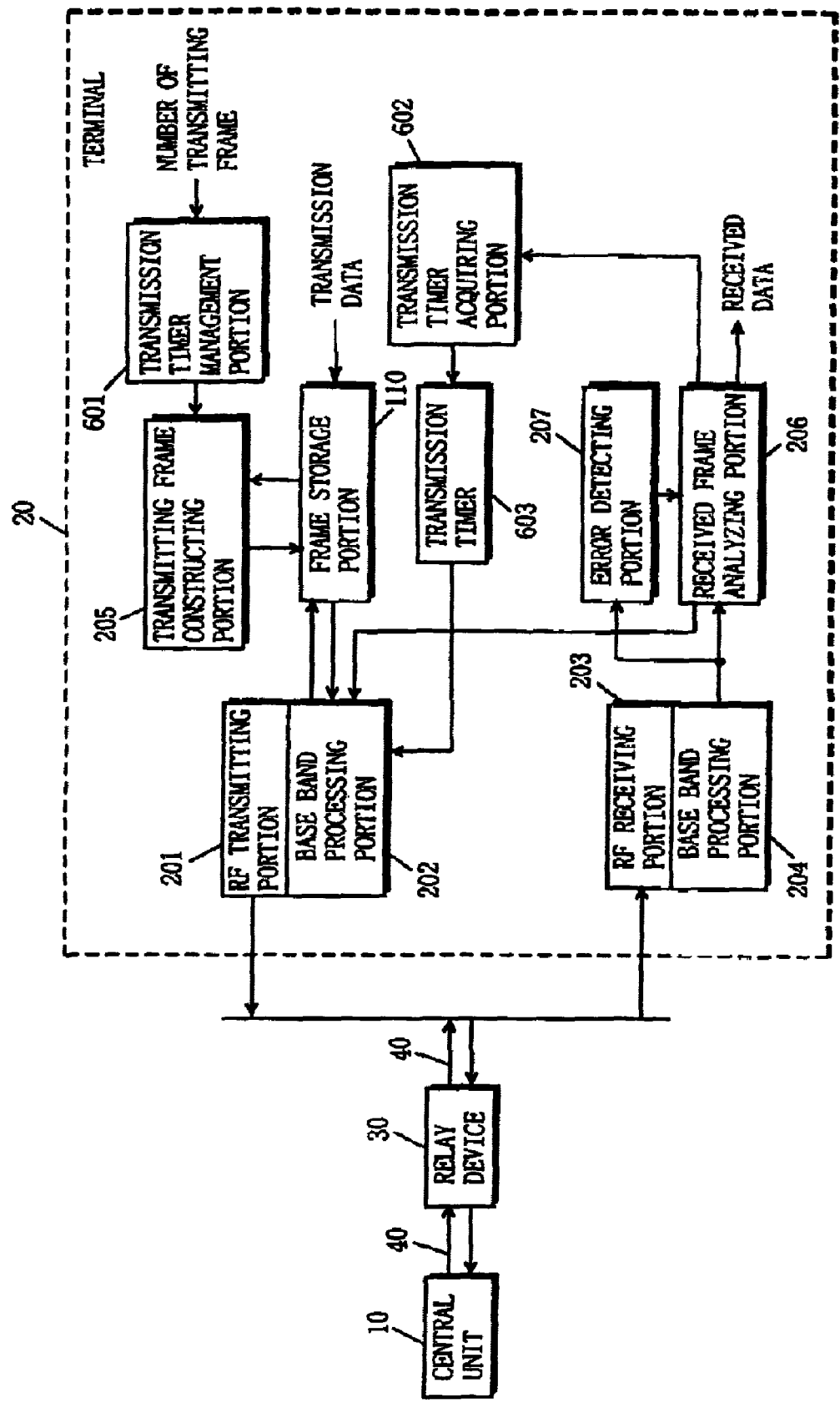
FIG. 7 is a block diagram showing the structure of the system in which the data transmission method according to the second embodiment applied, focusing on the structure of the terminal 20.
Figure 8:
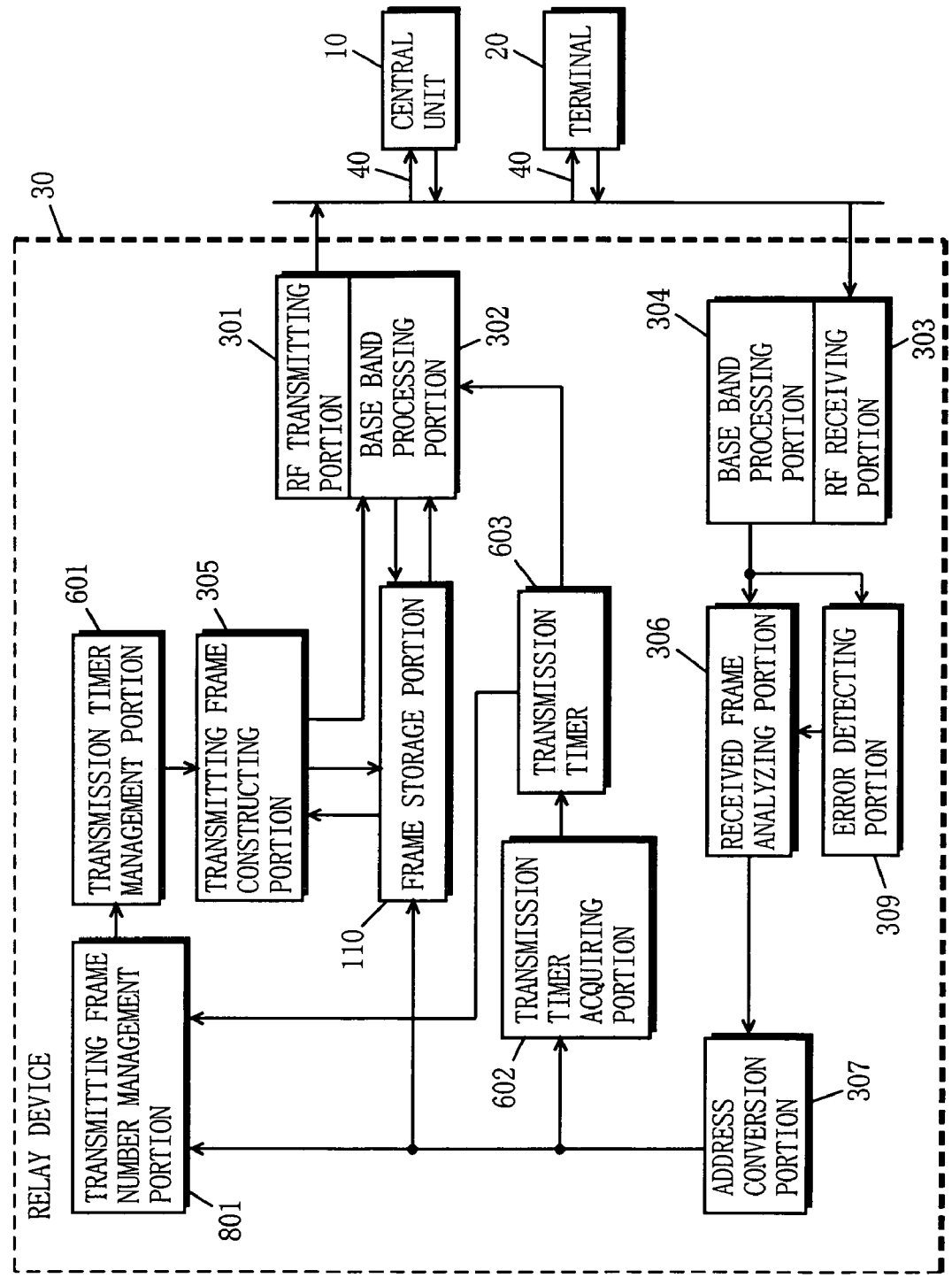
FIG. 8 is a block diagram showing the structure of the system in which the data transmission method according to the second embodiment, focusing on the structure of the relay device 30.
Figure 10:
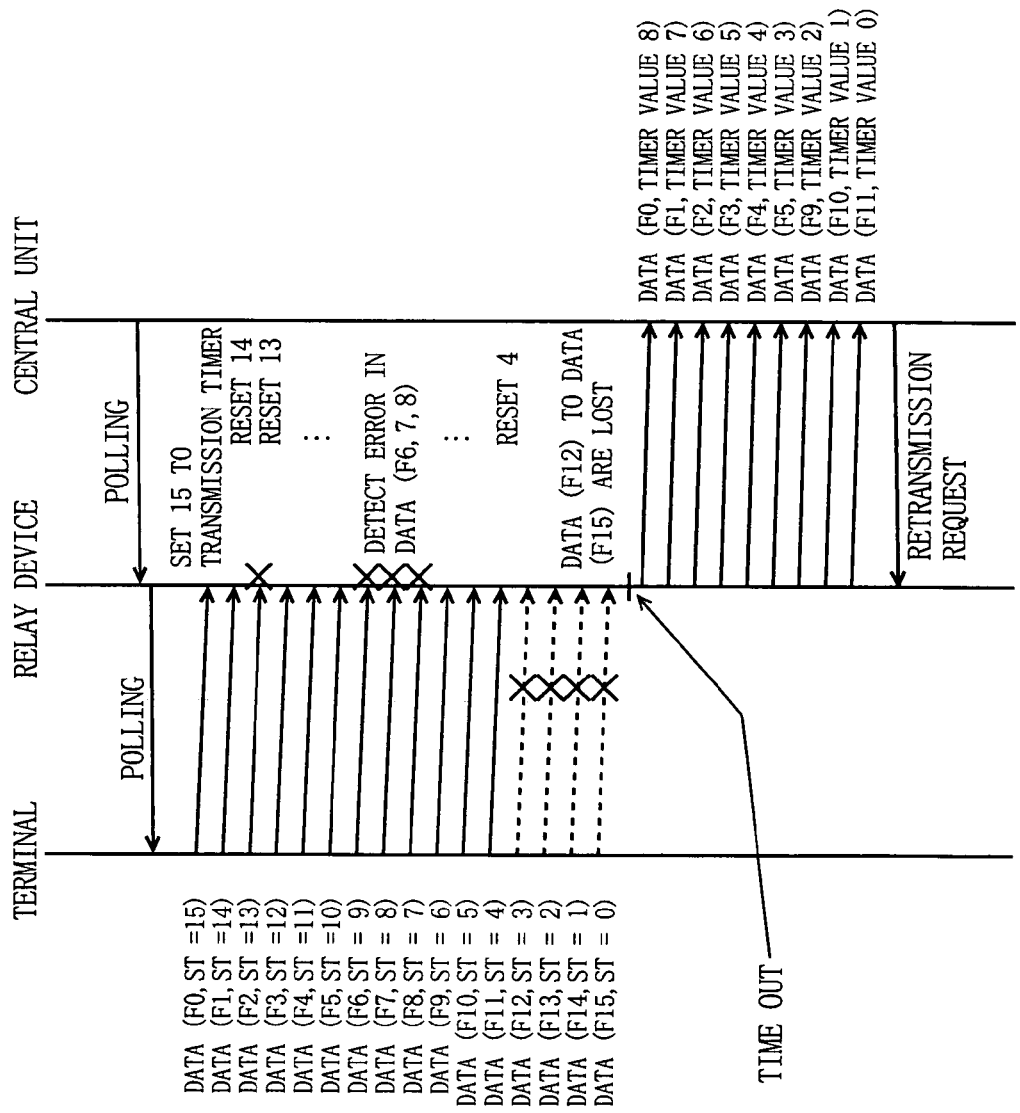
FIG. 10 is a diagram showing a sequence in the data transmission method according to the second embodiment.
Figure 11:
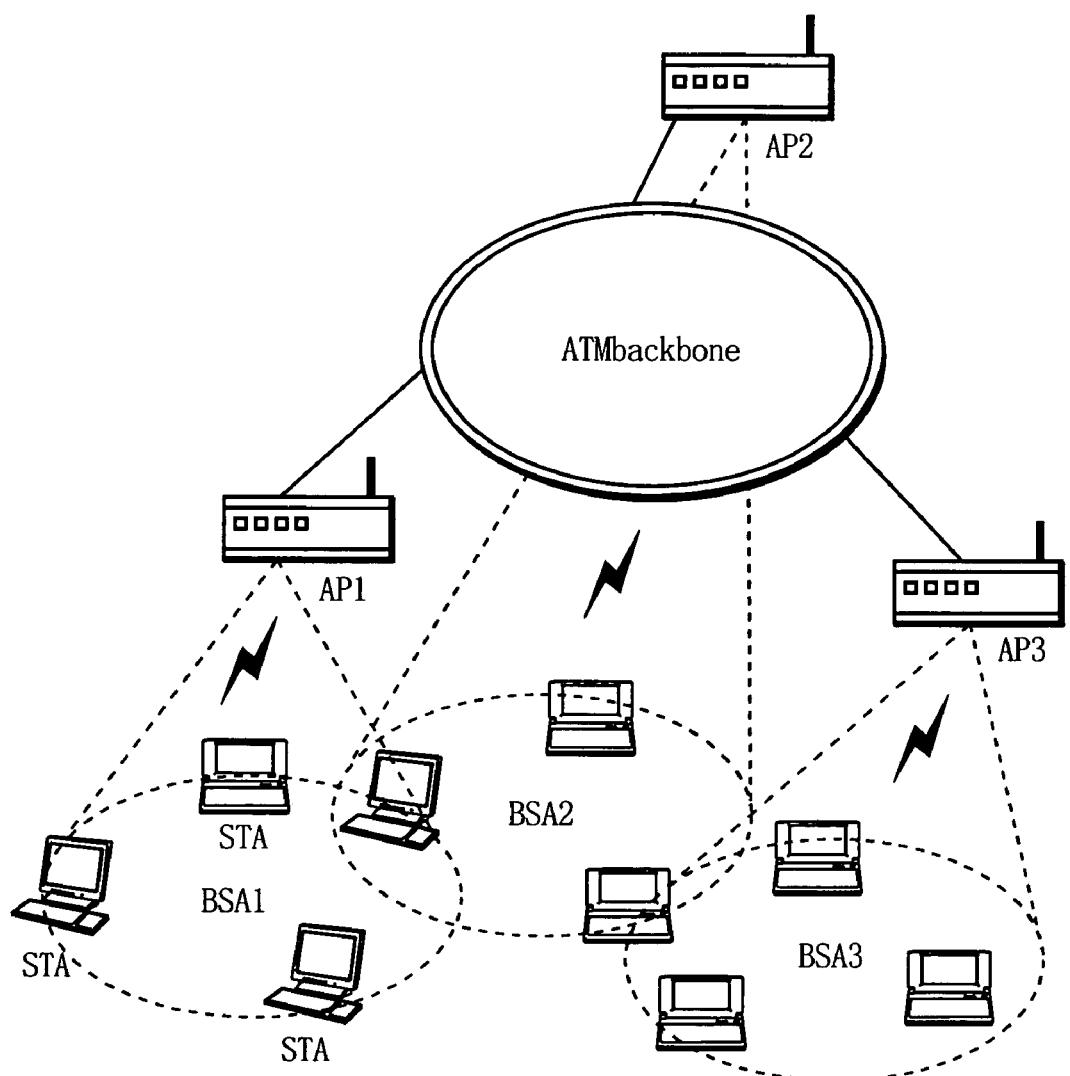
FIG. 11 is a diagram showing the configuration of a conventional millimetric radio wave ATM-LAN.
Figure 12:
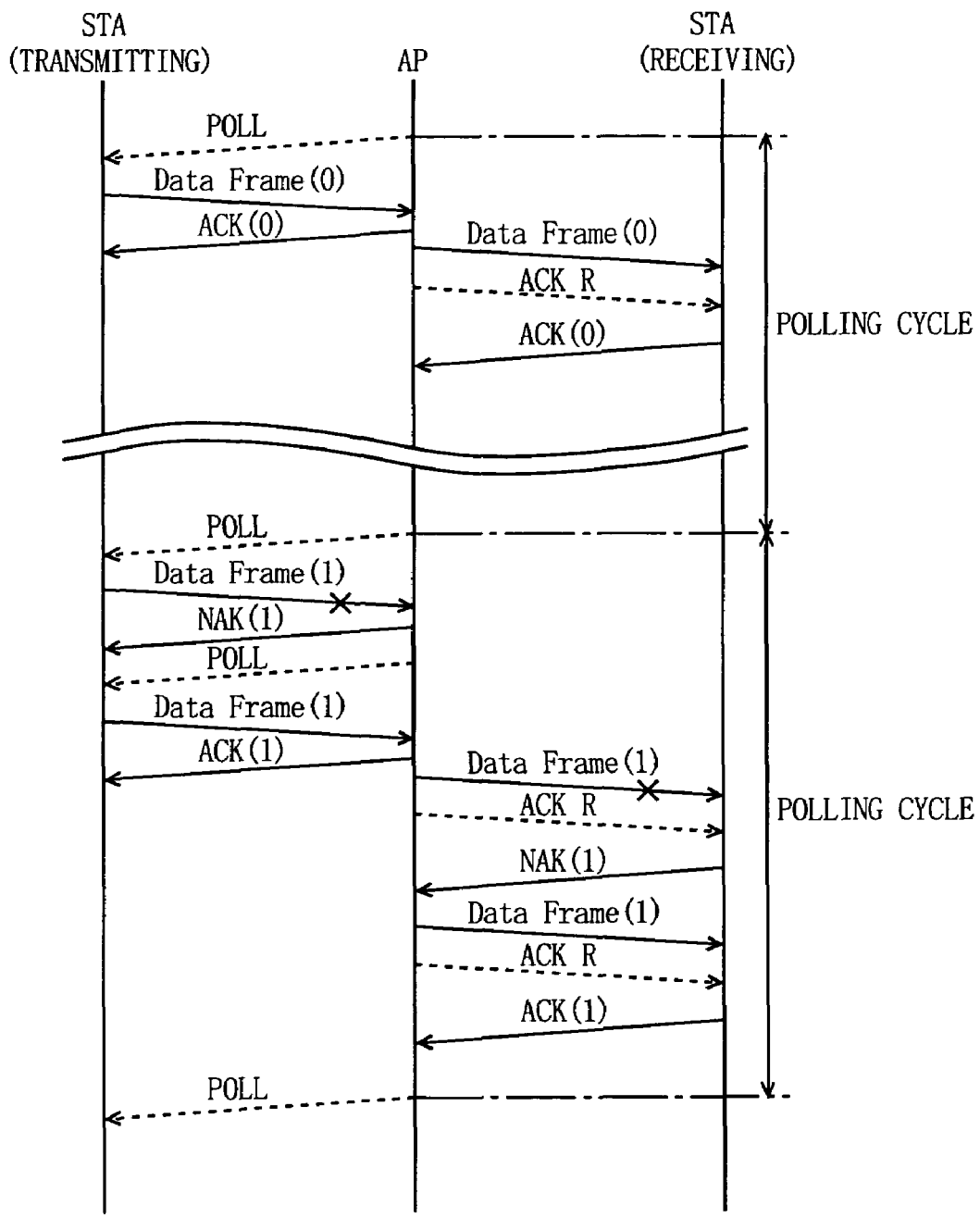
FIG. 12 is a diagram showing a sequence when an arbitrary STA on the conventional millimetric radio wave ATM-LAN transmits isochronous data to other STA via an AP.

FIGS. 6 to 8 are block diagrams showing the structure of a system adopting a data transmission method according to a second embodiment of the present invention. FIGS. 9A and 9B are diagrams exemplary showing the structure of bursts used in the data transmission method according to the second embodiment. FIG. 10 is a diagram showing a sequence in the data transmission method according to the second embodiment. By referring to FIGS. 6 to 10, described are a method, system, and device for data transmission according to the second embodiment.

Referring to FIG. 6, in the system adopting the data transmission method according to the second embodiment, similarly to the system in FIG. 1 adopting the data transmission method of the first embodiment, the central unit 10 and the terminal 20 are connected with each other via the relay device 30 and the radio transmission path 40. Therefore, in the second embodiment, description on the structure and operation identical to the system of the first embodiment is partially omitted, focusing on the differences.

In FIG. 6, the central unit 10 is not provided with the carrier detecting portion 109 of the central unit in FIG. 1, but is newly provided with a transmission timer management portion 601 receiving a signal from the received frame analyzing portion 107, a transmission timer acquiring portion 602, a transmission timer 603, a frame storage portion 110, and an initial value setting portion 604.

In FIG. 7, the terminal 20 is not provided with the carrier detecting portion 208 of the terminal in FIG. 2, but is newly provided with the transmission timer management portion 601, the transmission timer acquiring portion 602 receiving a signal from the received frame analyzing portion 206, the transmission timer 603, and the frame storage portion 110.

In FIG. 8, similarly to the relay device in FIG. 3, the relay device 30 is connected each other with the central unit 10 and the terminal 20 via the radio transmission path 40. The relay device 30 is not provided with the carrier detecting portion 308 of the relay device in FIG. 3, but is newly provided with the transmission timer management portion 601, the transmission timer acquiring portion 602 receiving a signal from the address conversion portion 307, a frame number management portion 801, the transmission timer 603, and the frame storage portion 110.

Next, by referring to FIGS. 9A and 9B, described is the structure of the bursts used in the data transmission method according to the second embodiment. FIG. 9A shows the structure of a descending burst which is transmitted from the central unit 10 to the terminal 20. FIG. 9B shows the structure of an ascending burst which is transmitted from the terminal 20 to the central unit 10.

The bursts in FIGS. 9A and 9B are mostly identical in structure to those in FIGS. 4A and 4B, respectively, and therefore, identical part is not described. The only difference observed in the bursts in FIGS. 9A and 9B is that ST is newly inserted subsequent to DNA. In ST, a transmission timer value indicating a total frame time of following data frames is stored. The transmission timer value is typically the number of frames to be transmitted subsequent to the present frame. Accordingly, the total frame time can be easily obtained by multiplying such number of subsequent frames by a frame time per frame.

Referring back to FIG. 6, the procedure of polling transmission, i.e., descending transmission, is described. In the central unit 10, the frame storage portion 110 receives transmission data for temporary storage. The transmitting frame constructing portion 105 receives the transmission data from the frame storage portion 110 and constructs a frame. for storage in the frame storage portion 110. In the constructed frame, SA and SNA are set as the data link address and the network address of the central unit 10, DA is set as the data link address of the relay device 30, and DNA is set as the network address of the terminal 20. Thus constructed frame is stored in the frame storage portion 110.

Further, the transmission timer management portion 601 receives the number of frames which are to be transmitted subsequent to the transmitting frame currently being constructed and sets the number as the transmission timer value ST. Herein, no frame is transmitted subsequent to the frame for polling. ST is thus set to 0. The polling cycle counting portion 106 works in the similar manner to that in the first embodiment. The transmission timer acquiring portion 602 acquires, from the received frame analyzing portion 107, the value set in ST of the received frame, and sets the value in the transmission timer 603.

The initial value setting portion 604 sets a predetermined initial value in the transmission timer 603 on either timing of issuance of a control signal corresponding to the polling cycle from the polling cycle counting portion 106 or issuance of instruction for transmitting a retransmission request.

The predetermined initial value is a value not less than the maximum transmission time possibly thought of. The maximum transmission time for the polling is typically obtained through calculation of: (the number of data frames+the number of polling frames)×(the number of relay devices+1) ×frame time per frame+processing time, and for the retransmission request: (the number of retransmission frames+the number of retransmission request frames)×(the number of relay devices+1)×frame time per frame+processing time. Note herein that the number of the polling frames and the retransmission request frames are 1.

Assume herein that the number of frames transmitted in response to the polling is 16, and the transmission is made via a single relay device. In such case, the initial value is determined as the sum of 2 frame time required for relay transmission of the polling, 32 frame time required for relay transmission of the 16 frames, and a time required for relay processing and response of the terminal (presumably 1 frame time). The sum adds up to 35 frame time and is determined as the initial value.

The determination of the initial value surely is not limited to the above described case where the frame time is used as a unit time. Further, the description in the above is exemplarily made for a case where the initial value is obtained through calculation. The initial value, however, may be an actual measurement value or a predicted value.

The transmission timer 603 subtracts the value set therein by 1 every time the transmission time for one frame (frame time) passes, for example, and when the value reaches 0, gives permission for transmission to the base band processing part 102. As described above, the initial value is set in the transmission timer 603 on timing of polling transmission, and thereafter, the value is subtracted every time the transmission time passes.

In the meanwhile, the transmission timer acquiring portion 602 acquires, from the received frame analyzing portion 107, the value set in ST of every received frame, and sets the value in the transmission timer 603 every time of acquisition. Therefore, if no frame is received, the permission for transmission will not be given until the initial value, or the maximum transmission time, set in the timer reaches 0. If even a single frame is received, the value set in ST of the received frame is set in the transmission timer 603. Accordingly, the permission for transmission will be given quicker based on the elapse of time indicated by ST.

Based on the control by the polling cycle counting portion 106 and the transmission timer 603, the base band processing portion 102 instructs the frame storage portion 110 to output data. Typically, the base band processing portion 102 outputs the clock for each frame to the frame storage portion 110. Based on the received clocks the frame storage portion 110 outputs the stored frames.

The base band processing portion 102 adds PR to the head frame outputted by the frame storage portion 110, and constructs the descending burst. The constructed burst is transmitted from the RF transmitting portion 101 to the terminal 20 via the radio transmission path 40.

The transmission of the descending burst is enabled when a control instruction from the polling cycle counting portion 106 or a transmission instruction of a retransmission request from a communication control portion (not shown in the drawing) is obtained, and also when the permission for transmission is obtained from the transmission timer 603. In this manner, the central unit 10 transmits the poling to the terminal 20 at the predetermined polling cycle, without collision with the ascending burst.

Further, when detecting that any frame is discarded in the received ascending burst, the central unit 10 can quickly transmit a retransmission request for the discarded frame without collision with any ascending burst.

Referring back to FIG. 8, described is the processing carried out by the relay device 30 when receiving the polling transmitted from the central unit 10 (in descending direction). In the relay device 30, the descending burst transmitted from the central unit 10 via the radio transmission path 40 is received by the RF receiving portion 303. The received descending burst is supplied to the base band processing portion 304.

The base band processing portion 304 establishes bit synchronization with the supplied descending burst by using PR, and establishes frame synchronization therewith by using UW. Thereafter, the base band processing portion 304 transfers the data following UW (SA to CRC) to the received frame analyzing portion 306 and the error detecting portion 309.

The error detecting portion 309 detects CRC error of the transferred data and informs the received frame analyzing portion 306 of any error detected. The received frame analyzing portion 306 confirms that DA in the transferred data indicates the address of the relay device 30, and if not informed of the error detection from the error detecting portion 309, transfers the entire frame including DNA to the address conversion portion 307.

The address conversion portion 307 stores correspondences between DNA and DA. The address conversion portion 307 searches for DA corresponding to DNA included in the frame transferred from the received frame analyzing portion 306, writes the search result into DA of the frame, and then transfers the frame to the frame storage portion 110, the transmitting frame number management portion 801, and the transmission timer acquiring portion 602. As an alternative method of address conversion, the central unit 10 may determine the route from SNA to DNA and adds information about the determined route as a group of DAs to every frame. In such manner, the address conversion portion 307 does not need to store the correspondences between DNA and DA for address conversion. Note, in this case, it is required to add such group of DAs indicating route information to each frame in FIGS. 9A and 9B. The present invention, however, is not restricted to any of the address conversion methods in exerting its effects. Next, the transmission timer acquiring portion 602 sets the acquired value of ST in the transmission timer 603. The transmitting frame number management portion 801 manages the number of frames to be transmitted in sequence, and informs the transmission timer management portion 601 of the number.

The transmitting frame constructing portion 305, for generation of the transmitting frame, refers to the frame temporarily stored in the frame storage portion 110 and rewrites SA of the frame to that of the relay device 30. The transmitting frame constructing portion 305 also sets ST of the stored frame as the value informed from the transmission timer management portion 601. Thereafter, the transmitting frame constructing portion 305 again refers to the stored frame, calculates CRC in the range from SA to the control region (Poll) and sets thus calculated CRC in the frame.

Here again, ST is 0 as stated above, and accordingly, the transmission timer acquiring portion 602 acquires ST=0. The transmission timer 603 thus gives the permission for transmission immediately. Then, the base band processing portion 302 immediately instructs the frame storage portion 110 to output the frame stored therein, adds PR to the frame outputted by the frame storage portion 110 and reconstructs the descending burst. The reconstructed descending burst is transmitted from the RF transmitting portion 301 to the terminal 20 via the radio transmission path 40.

Referring back to FIG. 7, in the terminal 20, the descending burst transmitted via the radio transmission path 40 is received by the RF receiving portion 203. The received burst is supplied to the base band processing portion 204.

The base band processing portion 204 establishes bit synchronization with the supplied descending burst by using PR, and establishes frame synchronization therewith by using UW. Thereafter, the base band processing portion 204 transfers the data following UW (SA to CRC) to the received frame analyzing portion 206 and the error detecting portion 207.

The error detecting portion 207 detects CRC error of the transferred data and informs the received frame analyzing portion 206 of any error detected. The received frame analyzing portion 206 confirms that DA in the transferred frame indicates the address of the terminal 20, and if not informed of error detection from the error detecting portion 207, analyzes the control region (Poll). The received frame analyzing portion 206 outputs a polling detection signal, which is a signal informing that the polling is detected as a result of the analysis, to the base band processing portion 202 and a communication control portion (not shown) provided in the terminal 20. The transmission timer acquiring portion 602 acquires ST=0 as the transmission timer value and sets the value 0 in the transmission timer 603.

Next, the procedure of data transmission, i.e., ascending transmission, is described. In the terminal 20, as described above, the received frame analyzing portion 206 outputs the polling detection signal to the base band processing portion 202 so as to instruct frame transmission. The frame storage portion 110 receives transmission data (Data) from the communication control portion (not shown) which was also supplied with the polling detection signal.

The transmitting frame constructing portion 205 refers to the frame stored in the frame storage portion 110 and sets the address of the terminal 20 to SA and SNA, the address of the relay device 30 to DA, and the network address of the central unit 10 to DNA. Thereafter, the transmitting frame constructing portion 205 calculates CRC with respect to SA, DA, SNA, DNA, and Data. In this way, the transmitting frame constructing portion 205 constructs n-frames (n is a natural number) for transmission.

At this point of time, ST=0 is set in the transmission timer 603, meaning that the permission is already given for transmission. Based on the control by the received frame analyzing portion 206 and the transmission timer 603, the base band processing portion 202 immediately instructs the frame storage portion 110 to output the frames stored therein.

The base band processing portion 202 adds PR to the head frame outputted by the frame storage portion 110 and constructs the ascending burst. The constructed ascending burst is transmitted from the RF transmitting portion 201 to the central unit 10 via the radio transmission path 40, without delay. In such manner, the terminal 20 transmits, in response to the single polling, the ascending burst composed of the n-frames.

Next, by referring to FIG. 8, described is the processing carried out by the relay device 30 when receiving the data transmitted from the terminal 20 (in ascending direction). In the relay device 30, the ascending burst transmitted from the terminal 20 via the radio transmission path 40 is received by the RF receiving portion 303. The received burst is supplied to the base band processing portion 304.

The base band processing portion 304 establishes bit synchronization with the supplied ascending burst by using PR, and establishes frame synchronization therewith by using UW. Thereafter, the base band processing portion 304 transfers the data following UW (SA to CRC) to the received frame analyzing portion 306 and the error detecting portion 309.

The error detecting portion 309 detects CRC error of the transferred data and informs the received frame analyzing portion 306 of any error detected. The received frame analyzing portion 306 confirms that DA indicates the address of the relay device 30, and if not informed of the error detection from the error detecting portion 309, transfers the entire frame including DNA to the address conversion portion 307.

The address conversion portion 307 stores correspondences between DNA and DA. The address conversion portion 307 searches for DA corresponding to DNA included in the frame transferred from the received frame analyzing portion 306, writes the search result into DA of the frame, and then transfers the frame to the frame storage portion 110, the transmitting frame number management portion 801, and the transmission timer acquiring portion 602. As an alternative address conversion method, the central unit 10 may determine the route from SNA to DNA and adds information about the determined route as a group of DAs to every frame. In such manner, the address conversion portion 307 does not need to store the correspondences between DNA and DA for address conversion. Note, in this case, it is required to add such group of DAs indicating route information to each frame in FIGS. 9A and 9B. The present invention, however, is not restricted to any of the address conversion methods in exerting its effects.

The transmission timer acquiring portion 602 acquires the transmission timer value ST in the received frame without error, and sets the value in the transmission timer 603. The transmission timer 603 typically stores the value in a unit of transmission time for one frame and subtracts the value by 1 every time such transmission time passes. When the value reaches 0, the transmission timer 603 gives permission for transmission to the base band processing portion 302 and informs the transmitting frame number management portion 801 of the completion of the receiving procedure.

In response thereto, the transmitting frame number management portion 801 informs the number of the received frames without error to the transmission timer management portion 601. The transmission timer management portion 601 controls the transmitting frame constructing portion 305 so as to calculate, for each transmitting frame, the number of frames to be sequentially transmitted subsequent thereto based on the informed number of the frames, and to set the calculated value as ST in each frame.

The transmitting frame constructing portion 305 rewrites SA of each frames stored in the frame storage portion 110 to that of the relay device 30, and calculates CRC in the range from SA to the data region. The transmitting frame constructing portion 305 also refers the stored frames one by one and sets ST as the value obtained by subtracting 1, in this example, from the value of ST set in the frame immediately before. The transmitting frame constructing portion 305 gives permission for transmission to the base band processing 302 at the instant of completing construction of frame 0 and writing the same in the frame storage portion 110.

Here, the base band processing portion 302 is prohibited from frame transmission until the permission is given by the transmission timer 603, that is, until the relay device 30 completes receiving the n-frames from the terminal 20. When the permission for transmission is given both by the transmitting timer 603 and the transmitting frame constructing portion 305, the base band processing portion 302 instructs the frame storage portion 110 to output the frames stored therein. The base band processing portion 302 adds PR to the head frame outputted by the frame storage portion 110 and reconstructs the ascending burst. The reconstructed ascending burst is transmitted from the RF transmitting portion 301 to the central unit 10 via the radio transmission path 40.

Next, by referring to FIG. 10, described in detail is the data transmission method according to the second embodiment applied in the above described data transmission system. In FIG. 10, data F0 to F15 each indicate a frame and ST=15 to ST=0 each indicate the transmission timer value ST in each frame. Each X denotes transmission error of a data frame. If no error ocurs in UW and thus the base band processing portion succeeded in receiving a data frame, such X is marked at the end of a solid line arrow. If any error occurs in UW and thus the base band receiving portion failed to receive a data frame, such X is marked on the middle of a dotted line arrow.

For polling procedure, the central unit 10 firstly transmits a polling to the relay device 30. Thereafter, the relay device 30 transmits the polling to the terminal 20. In response, the terminal 20 promptly returns the data frames (F0 to F15) in sequence.

The relay device 30 sequentially receives such data frames. Herein, the data frames F6, F7, and F8 are detected to have error by the error detecting portion 309, and thus are discarded. Further, the data frames F12 to F15 have error in UW, and thus are not received by the are not received by the base band processing portion 304. As a result, the frames exclusive of the above are subjected to address conversion in the address conversion portion 307, and then transferred to the transmitting frame constructing portion 305.

The transmission timer acquiring portion 602 acquires the value of ST in the received frame without error and sets the value in the transmission timer 603 as the transmission timer value. In this example, the transmission timer acquiring portion 602 acquires the values ST=15 to ST=10 in sequence and accordingly overwrites the transmission timer value.

From ST=9 to ST=7, the transmission timer acquiring portion 602 stops setting the transmission timer value. Nevertheless, the transmission timer 603 keeps on subtracting the transmission timer value for every one frame, as described above. Then, the transmission timer acquiring portion 602 starts overwriting the transmission timer value again from ST=6 until ST=4.

After that, the transmission timer acquiring portion 602 stops setting the transmission timer value, but the transmission timer 603 keeps on subtraction. When the data frame F15 is completely received, the transmission timer value reaches 0, i.e., time out. The transmission is thus permitted.

As such, the transmission timer 603 does not permit transmission while the data F0 to F15 are being received. As a result, the transmission of such data is started, sequentially from the data F0, at the instant when the reception of the data frame F15 is complete and when the transmission frame constructing portion 305 gives permission for transmission.

In this transmission, none of the error-detected frame is transmitted, enabling effective use of the transmission band. Further, the transmitting frame number management portion 801 counts the number of the frame to be transmitted, and based on the counted number, the transmission timer management portion 601 sequentially resets the value of ST. The central unit 10, being the receiving end, similarly performs transmission control using a transmission timer. Accordingly, the central unit 10 transmits, without delay, a retransmission request for such error-detected frames immediately after the receipt of nine frames, also enabling effective use of the transmission band.

Further, the initial value is set in the transmission timer 603 of the central unit 10 and is subtracted every time the transmission time passes. In this manner, even not receiving a single frame, the central unit 10 can transmit the retransmission request for the frames which have not been received, as described above.

As described in the foregoing, according to the data transmission method of the second, with such structure that sequentially transmitting n-frames in response to a transmission right granted by a single polling, efficiency is improved by n-times. Moreover, since the relay station does not transmit error-detected frames, the efficiency is further increased. Still more, the relay station can smoothly move to the transmission procedure without collision with any receiving frame even in a case where some frames out of the n-frames are not received due to radio transmission error.

The data transmission method of the second embodiment does not apply carrier-sensing in the physical layer as in the first embodiment. In this aspect, the data transmission method of this embodiment is especially effective when complicated processing is required for the carrier-sensing such as when spread-spectrum communication using FH (frequency hopping) technique is performed and when a communication system is structured for each of the physical layer, data link layer and network layer.

The data transmission system according to the second embodiment includes the relay device 30, but may include a plurality of relay devices. Or, in the data transmission system of this embodiment, the relay device 30 may not be included, and the central unit 10 and the terminal 20 may be connected via the radio transmission path 40. Even in such case, the central unit 10 can transmit a polling to the terminal 20 at a predetermined polling cycle without collision with the ascending burst.

Further, in the data transmission method according to the second embodiment, network addresses are used for routing. The network addresses are not necessarily used if only the route is already fixed, or if a connection ID, or the like, is used.

While the invention has been described in detail, the foregoing description is in all aspects illustrative and not restrictive. It is understood that numerous other modifications and variations can be devised without departing from the scope of the invention.

What is claimed is:

1. A data transmission method for communication between first and second transmission devices transmitting/receiving a data frame including a transmission timer value indicating a total frame time of data frames subsequent thereto by using a single transmission path, comprising the steps of:
   sequentially transmitting n-data-frames (where n is an arbitrary natural number) each said frame including the transmission timer value set to indicate (n-k) frame time (where k is an arbitrary natural number showing sequential order of transmission) from said first transmission device;
   detecting, at said second transmission device that has received one or more of the data frames each said frame including said transmission timer value, the transmission timer value included in an error-free data frame among the received data frames;
   managing, at said second transmission device, an elapse of the total frame time of the subsequent data frames by using the detected transmission timer value and managing an elapse of a time period by using a predetermined initial value when no transmission timer value is detected, for confirming that said transmission path is available; and
   transmitting one or more data frames in sequence from said second transmission device when said transmission path is confirmed being available.

2. The data transmission method according to claim 1, wherein
   said transmission path is implemented by radio transmission in an arbitrary frequency band.

3. The data transmission method according to claim 1, wherein
   said predetermined initial value is determined as the maximum time required for error-free transmission of all of said data frames.

4. The data transmission method according to claim 1, wherein
   in said step of detecting said transmission timer value, the mission timer value is detected from every error-free data fame among the data flames received by said second transmission device; and
   in said step of confirming that said transmission path is available, an elapse of the total frame time of the subsequent data frames is started to be managed every time said transmission timer value is detected.

5. A data transmission method for communication between first and second transmission devices transmitting/receiving a data frame including a transmission timer value indicating a total frame time of data frames subsequent thereto via a relay device by using a single transmission path, comprising the steps of:
   sequentially transmitting n-data-frames (where n is an arbitrary natural number) each said frame including the transmission timer value set to indicate (n-k) frame time (where k is an arbitrary natural number showing sequential order of transmission) from said first transmission device;

detecting, at said relay device that has received one or more of the data frames each said frame including said transmission timer value, an error in each of the received data frames;

detecting, at said relay device, the transmission timer value included in an error-free data frame among the received data frames;

setting, at said relay device, m-data frames (where m is a natural number not more than n) in which no error was detected as data frames to be transmitted;

setting, at said relay device, the transmission timer value for each of the data frames set as the data frames to be transmitted so as to indicate (m-k) frame time;

managing, at said relay device, an elapse of the total frame time of the subsequent data frames by using the detected transmission timer value for confirming that said transmission path is available; and transmitting one or more data frames in sequence from said relay device to said second transmission device when said transmission path is confirmed being available.

6. The data transmission method according to claim 5, wherein
said transmission path is implemented by radio transmission in an arbitrary frequency band.

7. The data transmission method according to claim 5, wherein
in said step of detecting said transmission timer value, the transmission timer value is detected from every error-free data frame among the data frames received by said relay device; and
in said step of confirming that said transmission path is available, an elapse of the total frame time of the subsequent data frames is started to be managed every time said transmission timer value is detected.

8. A data transmission system for communication between first and second transmission devices transmitting/receiving a data frame including a transmission timer value indicating a total frame time of data frames subsequent thereto by using a single transmission path, wherein
said first and second transmission devices each comprise:
a receiving portion for receiving the data frame including said transmission timer value;
a transmission timer acquiring portion for acquiring the transmission timer value included in the data fame received by said receiving portion;
a transmission timer for suspending transmission for a frame time indicated by the transmission timer value acquired by said transmission timer acquiring portion, and when none of said timer values is acquired, suspending transmission for a time indicated by a predetermined initial value;
a transmit fame constructing portion for constructing a data frame to be transmitted including the transmission timer value so set as to indicate the total frame time of the data frames subsequent thereto; and
a transmitting portion for transmitting the data frame to be transmitted constructed by said transmitting frame constructing portion, and
said second transmission device, when received one or more of the data frames transmitted from said first transmission device, confirms, by said transmission timer provided therein, that said transmission path is available through an elapse of the time of suspending transmission, and then transmits one or more of the data frames to be transmitted constructed by said transmitting frame constructing portion in sequence.

9. The data transmission system according to claim 8, wherein
said transmission path is implemented by radio transmission in an arbitrary frequency band.

10. The data transmission system according to claim 8, wherein
said predetermined initial value is determined as the maximum time required for error-free transmission of all of said data frames.

11. A data transmission system for communication between first and second transmission devices transmitting/receiving a data frame including a transmission timer value indicating a total frame time of data frames subsequent thereto via a relay device by using a single transmission path, wherein
said first and second transmission devices each comprise:
a first receiving portion for receiving the data frame including said transmission timer value;
a first transmission timer acquiring portion for acquiring the transmission timer value included in the data frame received by said first receiving portion;
a first transmission timer for suspending transmission for a frame time indicated by the transmission timer value acquired by said first transmission timer acquiring portion, and when none of said timer values is acquired, suspending transmission for a time indicated by a predetermined initial value;
a first transmitting frame constructing portion for constructing a data frame to be transmitted including the transmission timer value so set as to indicate the total frame time of data frames subsequent thereto; and
a first transmitting portion for transmitting the data frame to be transmitted constructed by said first transmitting frame constructing portion, said relay device comprises:
a second receiving portion for receiving the data frame including said transmission timer value;
an error detecting portion for detecting an error in the data frame received by said second receiving portion;
a received frame analyzing portion for setting the data frame in which no error was detected by said error detecting portion as a data frame to be transmitted;
a second transmission timer acquiring portion for acquiring the transmission timer value included in an error-free data frame among the received data frames;
a second transmission timer for suspending transmission for a frame time indicated by the transmission timer value acquired by said second transmission timer acquiring portion,
a second transmitting frame constructing portion for constructing a data frame to be transmitted including the transmission timer value so set as to indicate the total frame time of the data frames subsequent thereto; and
a second transmitting portion for transmitting the data frame to be transmitted constructed by said second transmitting frame constructing portion, and
said relay device, when received one or more of the data frames transmitted from said first transmission device, confirms, by said second transmission timer provided therein, that said transmission path is available through an elapse of the time of suspending transmission, and then transmits one or more of the data frames to be transmitted constructed by said second transmitting frame constructing portion to said second transmission device in sequence.

12. The data transmission system according to claim 11, wherein
said transmission path is implemented by radio transmission in an arbitrary frequency band.

13. A transmission device for transmitting/receiving a data frame including a transmission timer value indicating a total frame time of data frames subsequent thereto by using a single transmission path, comprising:
- a receiving portion for receiving the data frame including said transmission timer value;
- a transmission timer acquiring portion for acquiring the transmission timer value included in the data frame received by said receiving portion;
- a transmission timer for suspending transmission for a frame time indicated by the transmission timer value acquired by said transmission timer acquiring portion, and when none of said timer values is acquired, suspending transmission for a time indicated by a predetermined initial value;
- a transmitting frame constructing portion for constructing a data frame to be transmitted including the transmission timer value so set as to indicate the total frame time of the data frames subsequent thereto; and
- a transmitting portion for transmitting the data frame to be transmitted constructed by said transmitting frame constructing portion, and
- when received one or more data frames, confirming, by said transmission timer, that said transmission path is available through an elapse of the timer of suspending transmission, and then transmitting one or more of the data frames to be transmitted constructed by said transmitting frame constructing portion in sequence.

14. The transmission device according to claim 13, wherein
said predetermined initial value is determined as the maximum time required for error-free transmission of all of said data frames.

15. A relay device for relaying data transmission from a first transmission device transmitting a data frame including a transmission timer value indicating a total frame time of data frames subsequent thereto, to a second transmission device by using a single transmission path, comprising:
- a receiving portion for receiving the data frame including said transmission timer value;
- an error detecting portion for detecting an error in the data frame received by said receiving portion;
- a received frame analyzing portion for setting only the data frame in which no error was detected by said error detecting portion as a data frame to be transmitted;
- a transmission timer acquiring portion for acquiring the transmission timer value included in the data frame received by said receiving portion;
- a transmission timer for suspending transmission for a frame time indicated by the transmission timer value acquired by said transmission timer acquiring portion;
- a transmitting frame constructing portion for constructing a data frame to be transmitted including the transmission timer value so set as to indicate the total frame time of the data frames subsequent thereto; and
- a transmitting portion for transmitting the data frame to be transmitted constructed by said transmitting frame constructing portion, and
- when received one or more data frames transmitted from said first transmission device, confirming, by said transmission timer, that said transmission path is available through an elapse of the time of suspending transmission, and then transmitting one or more of the data frames to be transmitted constructed by said transmitting frame constructing portion to said second transmission device in sequence.

* * * * *

UNITED STATES PATENT AND TRADEMARK OFFICE
CERTIFICATE OF CORRECTION

PATENT NO. : 6,975,641 B1
DATED : December 13, 2005
INVENTOR(S) : Akio Kurobe et al.

It is certified that error appears in the above-identified patent and that said Letters Patent is hereby corrected as shown below:

Column 24,
Line 51, replace "mission" with -- transmission --.
Line 52, replace "fame" with -- frame --.
Line 52, replace "flames" with -- frames --.

Column 25,
Line 48, replace "fame" with -- frame --.
Line 56, replace "transmit fame" with -- transmitting frame --.

Column 27,
Line 35, replace "timer" with -- time --.

Signed and Sealed this

Eighteenth Day of April, 2006

JON W. DUDAS
*Director of the United States Patent and Trademark Office*